United States Patent [19]

Miyazaki et al.

[11] Patent Number: 5,773,937
[45] Date of Patent: Jun. 30, 1998

[54] DISCHARGE LAMP-LIGHTING APPARATUS FOR STRAIGHTENING ARC DISCHARGE

[75] Inventors: Koji Miyazaki, Yawata; Makoto Horiuchi, Nara; Shigeru Horii, Takatsuki; Satoshi Kominami, Osaka; Tatsushi Higuchi, Nishinomiya, all of Japan

[73] Assignee: Matsushita Electric Industrial Co., Ltd., Osaka, Japan

[21] Appl. No.: 560,683

[22] Filed: Nov. 20, 1995

[30] Foreign Application Priority Data

| Nov. 18, 1994 | [JP] | Japan | 6-285015 |
| Nov. 25, 1994 | [JP] | Japan | 6-291045 |
| Feb. 15, 1995 | [JP] | Japan | 7-027074 |
| Aug. 24, 1995 | [JP] | Japan | 7-215834 |

[51] Int. Cl.$^6$ ........................... H05B 41/16
[52] U.S. Cl. ................ 315/246; 315/209 R; 313/637
[58] Field of Search ................ 315/209 R, 246, 315/287, 326; 313/638, 639, 640, 641, 642, 637

[56] References Cited

U.S. PATENT DOCUMENTS

| 4,983,889 | 1/1991 | Roberts | 315/246 |
| 5,121,034 | 6/1992 | Allen et al. | 315/246 |
| 5,436,533 | 7/1995 | Fromm et al. | 315/246 |

FOREIGN PATENT DOCUMENTS

| 0 502 273 | 9/1992 | European Pat. Off. . |
| 0 626 799 | 11/1994 | European Pat. Off. . |

*Primary Examiner*—Robert Pascal
*Assistant Examiner*—David H. Vu
*Attorney, Agent, or Firm*—Beveridge, DeGrandi, Weilacher & Young, LLP

[57] ABSTRACT

An apparatus that obtains a straight discharge arc during the whole lighting period, as well as provides a discharge lamp-lighting apparatus which can form a plurality of luminous intensity distribution patterns by changing the shape of the discharge arc. By supplying a lighting waveform equal to an acoustic resonance frequency which lighting waveform excites the mode to make the discharge arc straight. The acoustic resonance frequency is determined by the sound velocity in the discharge space medium and the height of a section orthogonal area to the electrode axis to the discharge lamp. The shape of the discharge arc at the time of rated lighting can be made substantially straight. By supplying the lighting waveform which amplifies the amplitude of the compressional wave emitted from the discharge arc during the period when the vapor pressure of the filler of the discharge lamp is low, the shape of the discharge arc can be made straight during the whole lighting period. By changing the ratio of the acoustic resonance frequency component, the shape of the discharge arc can be changed.

34 Claims, 22 Drawing Sheets

| | Sine wave of 76.7 kHz (art of the present invention) | Rectangular wave of 400 Hz (prior art) |
|---|---|---|
| Shape of the discharge arc | | |
| Size of the bending of the discharge arc | 0.05 mm | 0.50 mm |
| Luminous efficacy | 94.3 (Lumen/Watt) | 85.7 (Lumen/Watt) |
| Highest temperature of the upper surface of silica glass | 845 °C | 950 °C |
| Highest temperature of the lower surface of silica glass | 815 °C | 790 °C |

Fig. 2

| | Sine wave of 23.0 kHz (art of the present invention) | Triangular wave of 23.0 kHz (art of the present invention) | Rectangular wave of 120 Hz (prior art) |
|---|---|---|---|
| Shape of the discharge arc |  |  |  |
| Size of the bending of the discharge arc | 0.04 mm | 0.17 mm | 1.70 mm |
| Luminous efficacy | 78.6 (Lumen/Watt) | — | 71.4 (Lumen/Watt) |
| Highest temperature of the upper surface of silica glass | 890 °C | — | 980 °C |
| Highest temperature of the lower surface of silica glass | 860 °C | — | 820 °C |

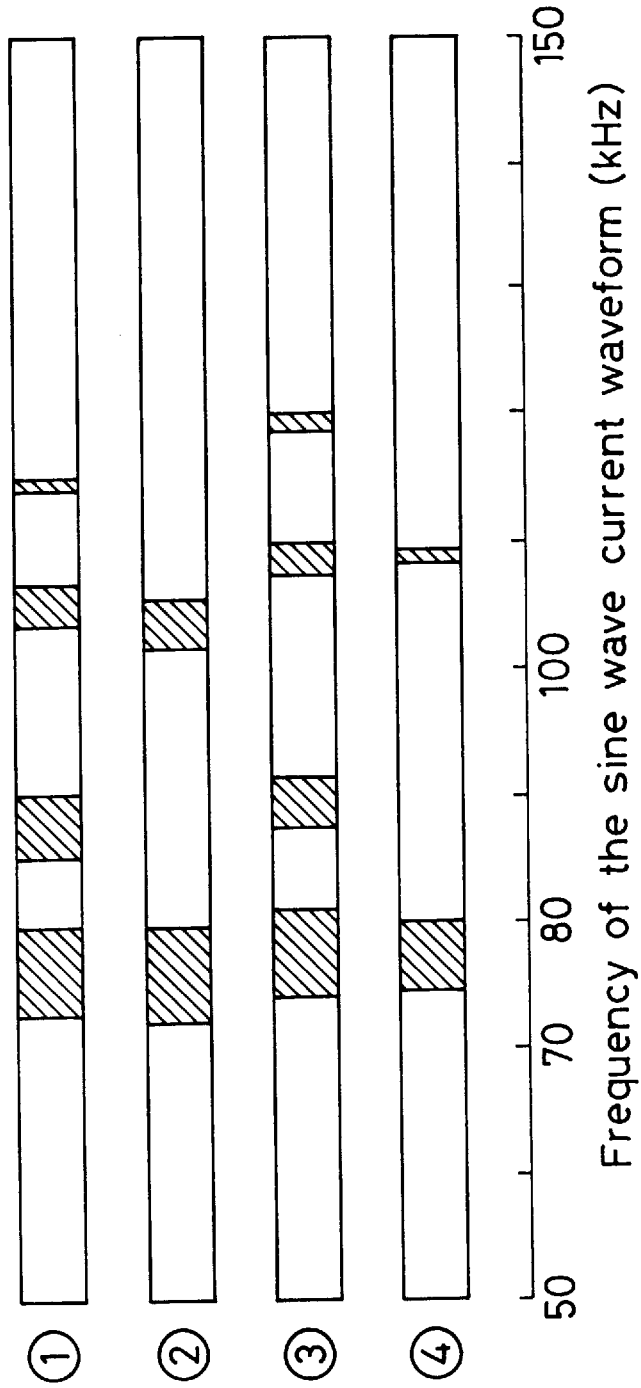

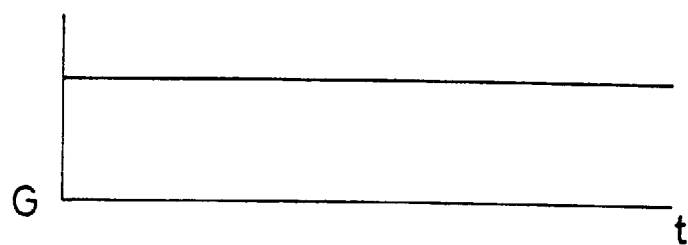
Fig.20(a) PRIOR ART   Frequency : 400 Hz
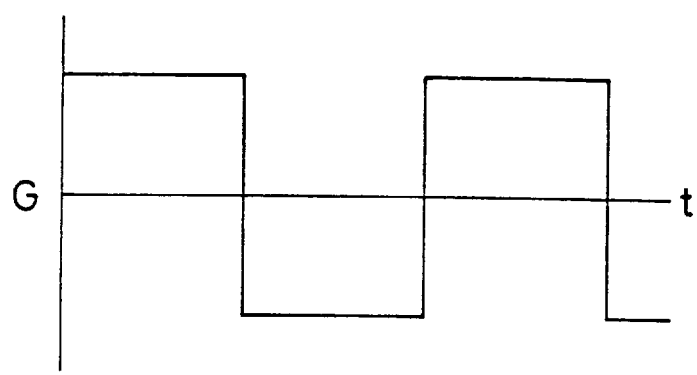
Fig.20(b) PRIOR ART   Frequency : 400 Hz

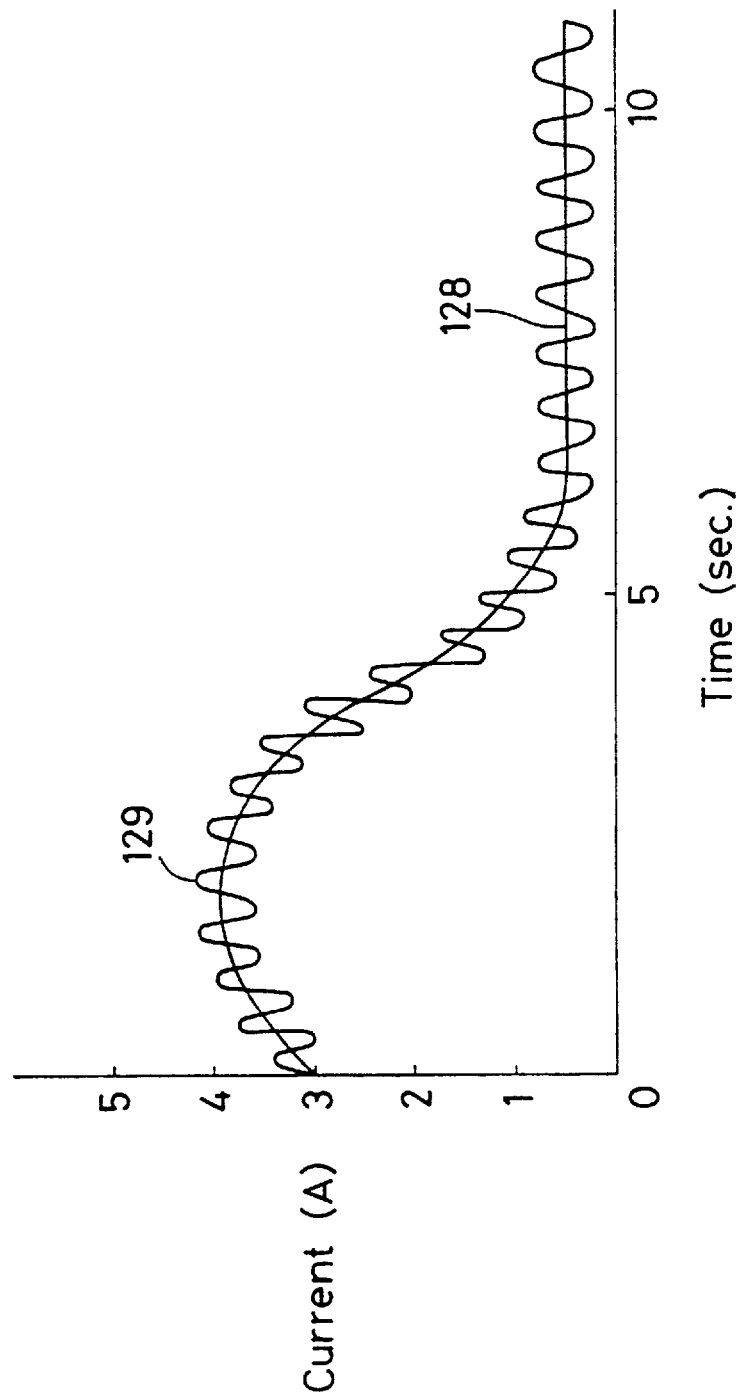

DISCHARGE LAMP-LIGHTING APPARATUS FOR STRAIGHTENING ARC DISCHARGE

DETAILED DESCRIPTION OF THE INVENTION

1. Industrial Field of the Utilization

The present invention relates to a discharge lamplighting apparatus which lights a discharge lamp with a lighting waveform having frequency components which excite the mode in which the acoustic resonance makes the discharge arc straight, in order to reduce the bending of the discharge arc due to the gravitational inductive convection harmful to the discharge lamp.

Furthermore, the present invention relates to a discharge lamp-lighting apparatus which lights a discharge lamp with a lighting waveform which amplifies the amplitude of the compressional wave emitted from the discharge arc during a period of low vapor pressure of a filler such as metal halide and mercury, in order to make the discharge arc stable and always straight. The present invention is particularly useful for the HID lamp (High Intensity Discharge lamp).

Furthermore, the present invention relates to a discharge lamp-lighting apparatus which controls the bending of the discharge arc of the discharge lamp and forms more than one light-arranging pattern with one discharge lamp. The present invention is particularly useful for vehicle headlights.

2. Related Art of the Invention

Recently, the HID lamp has been widely applied for outdoor lighting and the like because of its characteristics of high efficiency and long life. Among the types of HID lamps, the metal halide lamp has excellent color rendering properties and is becoming popular not only in outdoor lighting but also in indoor lighting, making the best use of these characteristics, and the metal hallide lamp attracts attention as a light source for picturing devices and a light source for vehicle headlights. One conventional discharge lamp-lighting apparatus has been described in Collected Papers No. 10 of Tokyo Local Meeting of the Lighting Society in 1983. This discharge lamp-lighting apparatus will be described in detail with reference to FIG. 19.

FIG. 19 is a basic structural view of the conventional discharge lamp-lighting apparatus. Referring to FIG. 19, 101 represents a metal halide lamp as a discharge lamp, and 102 represents a lighting circuit for starting and lighting the metal halide lamp 101.

The lighting circuit 102 is composed of a direct-current power supply 103, a full bridge inverter circuit 104 and a starting means 105. The direct-current power supply 103 is composed of an alternating-current power supply 106 for commercial-use, a rectifying and smoothing circuit 107 for converting the output of the commercial-use alternating-current power supply 106 to direct current through rectification and smoothing, and a step-down chopper circuit 116. The step-down chopper circuit 116 is composed of a transistor 108; a diode 109; a choke coil 110; a condenser 111; resistors 112, 113 and 114; and a control circuit 115. The control circuit 115 inputs the output of the rectifying and smoothing circuit 107 and controls the power to be supplied to the metal halide lamp 101 at a predetermined value. The step-down chopper circuit 116 detects the output voltage with the resistors 112 and 113, detects the output current with the resistor 114 to calculate the two detected signals by the control circuit 115, and controls the ON/OFF switching of the transistor 108 with the output signal of the control circuit 115 so that the output power of the step-down chopper circuit 116 becomes the predetermined value. At this time, the output voltage of the step-down chopper circuit 116 is a predetermined direct voltage, and the output voltage waveform of the step-down chopper circuit 116 is shown in FIG. 20 (a).

The full bridge inverter circuit 104 is composed of transistors 117, 118, 119, and 120 and a drive circuit 121. The full bridge inverter circuit 104 has a structure that the output of the step-down chopper circuit 116 is converted to the alternating current by alternately controlling the ON/OFF switching of transistors 117 and 120, and transistors 118 and 119 are controlled by the output signal of the drive circuit 121. The rectangular voltage waveform shown in FIG. 20 (b) is the instantaneous voltage outputted from the full bridge inverter circuit 104, which does not temporally change. Furthermore, the starting means 105 generates a high-pressure pulse to turn on the metal halide lamp 101.

With the above-mentioned structure, when the high-pressure pulse generated from the starting means 105 is applied to the metal halide lamp 101 and the metal halide lamp 101 is lighted. The control circuit 115 calculates the signal proportional to the lamp current of the metal halide lamp 101 detected by resistors 112 and 113, calculates the signal proportional to the lamp voltage of the metal halide lamp 101 detected by a resistor 114, and controls the ON/OFF switching of the transistor 108 so that the power supplied to the metal halide lamp 101 reaches the rated lamp power. A predetermined direct voltage is outputted from the step-down chopper circuit 116 and converted to a rectangular alternating waveform by the full bridge inverter circuit 104 to which the output of the step-down chopper circuit 116 is inputted, whereby the metal halide lamp 101 maintains the lighting with a rectangular alternating waveform.

In addition, the frequency of the alternating current converted by the full bridge inverter circuit 104 is generally several hundred Hz in order to avoid the problems such as fluctuations and discontinuance of the discharge arc, or explosion of the metal halide lamp 101 resulting from the acoustic resonance phenomenon peculiar to the HID lamp. The conventional discharge lamp-lighting apparatus shown in FIG. 19 is set to 400 Hz.

FIG. 21(a) shows the structure that the metal halide lamp 101 is seen from the side when the metal halide lamp 101 is horizontally lighted.

In FIG. 21(a), 122 and 123 represent electrodes, 124 represents a silica glass constituting the metal halide lamp 101, and 125 represents a discharge arc. When the metal halide lamp 101 is lighted, the temperature in the central portion of the discharge arc reaches about 5000K, and the temperature drops at a predetermined temperature gradient from the arc central portion to about 1000K in the vicinity of the tube wall. Therefore, such a convection phenomenon is caused that the gas heated in the arc central portion to have small density moves upward, and the gas having large density in the vicinity of the tube wall flows into the central portion.

FIG. 21(b) is a cross-sectional view of FIG. 21(a) taken at XXIb—XXIb showing the flow of gas due to the convection in a section orthogonal area which can be any cross-sectional area perpendicular to the electrode axis between electrodes 122 and 123. The gas flow due to the convection is shown by the arrows.

The discharge arc 125 is located in the upper portion of a section orthogonal area, because of the gas flow due to the convection. Therefore, the discharge arc 125 bends upward as shown in FIG. 21(a).

Particularly in recent years, the metal halide lamp which attracts attention as a light source for picturing devices and a light source for vehicle headlights has been provided with a short arc, thereby the mercury pressure at the time of lighting has to be increased. The increase of the mercury pressure further increases the convection and the bending of the discharge arc.

Problems arise when the discharge arc is curved. First, the distance between the silica glass in the upper portion of the discharge space and the discharge arc becomes too small thus greatly increasing the temperature of the silica glass. Second, there is a large decrease of luminous flux due to the deterioration of the silica glass during its life span, that is devitrification, and a large decrease of the beam-condensing efficiency at the time of being combined with a reflector. Third, moreover, deformation (swelling) caused by the softening of the silica glass increases the inner volume of the discharge space, whereby the luminous efficacy is changed. Furthermore, these changes lead to a temperature drop in the lower portion of the discharge space decreasing the temperature at the coolest point which determines the is operational pressure within the discharge space, whereby the luminous efficacy is decreased.

As a lighting method which solves these problems, there is the method disclosed in Japanese Patent Publication No. Hei 5-57693 (U.S. Pat. No. 4,983,889). In Japanese Patent Publication No. Hei 5-57693, there is taught a presence of a narrow frequency range which excites acoustic resonance vibration in the filler of the discharge lamp detected by experiments in a range from about 20 kHz to about 100 kHz decreasing the influence of the convection, preventing the bending in the upper direction of the discharge arc, and making the discharge arc roughly straight.

When the discharge arc is made straight, there can be obtained such advantages as improvement of utilization efficiency of lights at the time of being combined with the reflector, longer life for the lamp from the temperature drop at the high temperature point in the upper portion of the discharge space, and improvement of the light-emitting efficiency by the temperature rise at the coolest point in the lower portion of the discharge space.

However, when the discharge lamp is lighted with a frequency which excites the acoustic resonance vibration at the time of rated lighting, the discharge arc moves/bends or causes discontinuance for several seconds at the beginning of lighting, thereby a stable straight discharge arc cannot be obtained.

As a lighting method to obtain the stable discharge arc at the beginning of lighting, there is the method disclosed in Japanese Patent Publication No. Hei 79835 (U.S. Pat. No. 5,198,727). The lighting method of this discharge lamp will be described with reference to FIG. 22. FIG. 22 is a view showing the time change of the lamp current from the time when the discharge lamp is lighted with the lighting method described above (Japanese Patent Publication No. Hei-9835).

In FIG. 22, the lamp current is such a current that the alternating-current component 129 of a frequency in which the influence of the convection of the filler of discharge lamp is reduced with the acoustic resonance and the discharge arc is made straight is superimposed on to the direct current 128. Immediately after the discharge lamp starts discharge, a large direct current 128 is started, and the level of the direct current 128 decreases with the lapse of time. At this time, since the frequency and the absolute value of the amplitude of the alternating-current component 129 are made constant for all periods, the modulation depth (the one which is obtained by subtracting the minimum current from the maximum current, and thereafter being divided by twice the average current) is small immediately after the discharge is started, and increases with the lapse of the lighting time.

Thus by supplying the lamp current described above, the rate of the alternating-current component 129 which makes the discharge arc unstable immediately after the lighting of the discharge lamp is made minimum, and stable discharge arc is formed with the direct current. Thereafter, the modulation depth becomes large with the lapse of time, and the discharge arc is made straight by the acoustic resonance vibration. With the lamp current waveform described above, it is aimed to obtain stable discharge arc from immediately after the lighting to the rated lighting.

However, though it is shown that the frequency ranges which can make the discharge arc straight by the conventional lighting method described above (Japanese Patent Publication No. Hei 5-57693) are present in plural numbers, it has been found that the frequency range which can make the discharge arc straight is different for respective lamps, even if they are the same type of discharge lamps.

Therefore, it is necessary to design the lighting circuit for every lamp, or to make a lighting circuit which can be matched with wide frequency ranges, either of which requires a considerable increase in the cost of the lighting apparatus. Furthermore, when the discharge lamp is lighted by the conventional lighting method described above (Japanese Patent Publication No. Hei 7-9835), the rate of the alternating-current component 129 which excites the acoustic resonance is small immediately after the discharge lamp is lighted, and becomes the lamp current having roughly only the direct current 128. When the discharge lamp forms the discharge arc, the resulting temperature difference within the discharge space generates convection, therefore, the discharge arc of the discharge lamp horizontally lighted at the initial stage of lighting bends upward, though it is smaller compared to the time of rated lighting.

The direct current further increases the bending of the discharge arc. Therefore, at the time immediately after the discharge lamp is lighted, the discharge arc bends and comes near to the straight discharge arc gradually, since the modulation depth of the alternating-current component which excites the acoustic resonance becomes large with the lapse of time. Namely, it has a defect in that the shape of the discharge arc changes. Particularly in recent years, it has been proposed to make the discharge arc short in the light source for picturing devices and vehicle headlights. The mercury pressure at the time of lighting is higher, and xenon is included at high pressure in order to supplement the light output at the time immediately after the lighting. The increase of the mercury pressure and the existence of high-pressure xenon further increase the convection, and make the bending of the discharge arc large right after the lighting, whereby the shape change of the discharge arc becomes larger.

Problems occur when the shape of the discharge arc changes. When the discharge lamp is used in combination with a reflector, it is preferable that the shape of the discharge arc is linear on the optical axis of the reflector from the view point that it makes the beam-condensing efficiency of the reflector better. The first problem is that the beam-condensing efficiency is decreased at the initial stage of lighting when the shape of the discharge arc changes the light-arrangement characteristic to the irradiated plane changes. Furthermore, the curved discharge arc decreases the life of the lamp and lowers the light-emitting efficiency at the initial stage of lighting.

Furthermore, vehicle headlights require a switching function between the passing beam (low beam for oncoming traffic) and the travelling beam (high beam or brights for a empty road). The two light-arranging patterns of the passing beam and the travelling beam are generally changed by selectively switching between the two light-emitting portions. However, since the light-emitting portion of the discharge lamp is only one, two discharge lamp-lighting apparatuses (a lighting apparatus for the passing beam and a lighting apparatus for the travelling beam) are necessary to form the two light-arranging patterns, thus there is a problem that the vehicle headlights become large.

SUMMARY

The present invention solves the conventional problems described above, and the object thereof is to make the frequency range clear which can make the discharge arc always straight, if it is the same type of discharge lamp, and to provide a discharge lamp-lighting apparatus which has a lighting circuit with a cheap and simple structure that acts as a ballast circuit.

Furthermore, the object of the present invention is to provide a discharge lamp-lighting apparatus which can form and maintain the straight discharge arc during the whole lighting period of the discharge lamp (from immediately after lighting for starting the discharge lamp to rated lighting for operation under the rated power condition).

Furthermore, it is another object of the present invention to provide a discharge lamp-lighting apparatus which can form at least two light-arranging patterns with one discharge lamp. Particularly, to provide a discharge lamp-lighting apparatus which can switch between the passing beam and the travelling beam with one discharge lamp used as a light source for vehicle headlights.

In order to attain these objects, the discharge lamp-lighting apparatus of the present invention has a discharge lamp provided with a glass envelope defining the discharge space in which at least metal halide or mercury is sealed therein as a filler and a lighting circuit. The lighting circuit supplies a predetermined lighting waveform to the discharge lamp to light and operate the discharge lamp. The lighting circuit also selects a lighting waveform having a frequency component of the lowest acoustic resonance frequency determined by the sound velocity in the discharge space medium of the discharge lamp and the height of the section orthogonal area to make the discharge arc roughly straight.

Furthermore, the discharge lamp-lighting apparatus of the present invention includes a discharge lamp and a lighting circuit. The lighting circuit supplies a predetermined lighting waveform to the discharge lamp to light the discharge lamp, supplies a lighting waveform from the lighting circuit to the discharge lamp (for example, sine wave, triangular wave, sawtooth wave, stepped wave, exponential wave, complex wave and the like) in which the instantaneous value temporally changes with a frequency f, and selects the acoustic resonance frequency shown by a general formula (Equation 1) of the frequency f.

$$f = \frac{V}{2L} \qquad \text{Equation 1}$$

-continued
V = sound velocity in the discharge space medium of the discharge lamp
L = height of the section orthogonal area The lighting waveform acts as the waveform for operating the discharge lamps.

The section orthogonal area is a two-dimensional section in the region within the glass between the electrodes.

The present invention is further characterized in that the discharge space of the discharge lamp is in a shape having a flat portion in the vicinity of the central portion between the electrodes, and each section orthogonal area to the electrode axis of the discharge lamp has a roughly circular shape.

Furthermore, the lighting circuit includes a control means to detect the lamp characteristics of the discharge lamp to match the lighting frequency with the acoustic resonance frequency.

Furthermore, the control means has a means to detect the lamp voltage as a lamp characteristic of a discharge lamp and the lighting frequency in which the lamp voltage becomes lowest is the acoustic resonance frequency.

Furthermore, the discharge lamp-lighting apparatus of the present invention includes a discharge lamp and a lighting circuit. The lighting circuit has a means to select the lighting waveform to be supplied to the discharge lamp to be the one which has a frequency component of the acoustic resonance frequency as determined by the sound velocity in the discharge space medium and the height of the center section orthogonal area and excites a mode in which the discharge arc is made roughly straight, and has a period when the acoustic resonance frequency drops before it reaches the rated lighting after lighting of the discharge lamp.

Furthermore, the discharge lamp-lighting apparatus of the present invention has a structure of a discharge lamp and a lighting circuit. The lighting circuit has a means to select the lighting waveform to be supplied to the discharge lamp to be the one which has a frequency component of the acoustic resonance frequency as determined by the sound velocity in the discharge space medium and the height of the center section orthogonal area and excites a mode to make the discharge arc straight. The lighting circuit also has a means to select the lighting waveform to be the one which amplifies the amplitude of the compressional wave emitted from the discharge arc during a period of low vapor pressure of the filler of the discharge lamp.

Furthermore, the discharge lamp-lighting apparatus includes a means to supply the lamp current or lamp electric power higher than the rated value during the initial period of lighting when the lighting circuit warms the discharge lamp after lighting the discharge lamp and reduce it to the rated value. The discharge lamp-lighting apparatus also has a structure so as to speed up the rise of the light output.

Furthermore, the lighting circuit includes a lamp characteristic-detecting means which detects the lamp characteristic in order to change at least one means among a means to select a lighting waveform having the frequency component of the acoustic resonance frequency, a means to select a lighting waveform to amplify the amplitude of the compressional wave emitted from the discharge arc, and a means to supply the lamp current or lamp electric power higher than the rated value and reduce it to the rated value, according to the change of the lamp characteristic of the discharge lamp, and it is to detect the lamp voltage, the lamp impedance, the light output, the temperature of the light-emitting tube, or the elapsed time after lighting.

Furthermore, it is characterized that the lighting circuit includes a direct-current power supply B which outputs the direct current superimposed with a ripple waveform having the frequency component of the acoustic resonance frequency which excites a mode to make the discharge arc straight, and the lighting waveform having the ripple waveform is supplied to the discharge lamp.

Furthermore, an inverter circuit B is included therein which converts the output of the direct-current power supply B to the alternating current.

Moreover, the direct-current power supply B has at least one switching element which operates ON/OFF, and has such a structure that the ON/OFF frequency of the switching element is changed to change the frequency of the ripple waveform to be supplied to the discharge lamp, and the ratio of the ON period is changed to change the current or the power supplied to the discharge lamp.

Furthermore, the discharge lamp-lighting apparatus includes a discharge lamp, a lighting circuit which supplies a predetermined lighting waveform to light the discharge lamp and a light control means which irradiates the light emitted from the discharge lamp in the predetermined direction. The lighting waveform having the frequency component of the acoustic resonance frequency which excites a mode to make the discharge arc straight, and is able to form at least two luminous intensity distribution patterns by changing the rate of the frequency component of the acoustic resonance frequency to change the shape of the discharge arc.

Furthermore, in vehicle headlights in which the first luminous intensity distribution pattern is used for the passing beam and the second luminous intensity distribution pattern is used for the travelling beam, the shape of the discharge arc of the discharge lamp is roughly straight at the time of the beam which has a high usage beam pattern.

With the a fore-mentioned structure, when a waveform is supplied in which the instantaneous value changes temporally with a frequency f shown by the acoustic resonance frequency, particularly by the general formula (Equation 1), to the discharge lamp, the present invention can stably light with high frequency without causing any fluctuations and discontinuance of the discharge arc at the time of rated lighting of various discharge lamps of the same type, and can make the discharge arc of the discharge lamp straight.

The reason why the discharge lamp-lighting apparatus of the present invention can light stably without causing any fluctuations and discontinuance of the discharge arc, and the shape of the discharge arc is made straight can be inferred from the compressional wave emitted from the discharge arc. The periodical changes of the gas pressure in the discharge arc are caused by the periodical changes of the power supplied to the discharge lamp. This periodical change of the gas pressure becomes the compressional wave to be emitted from the discharge arc in the whole peripheral direction. The compressional wave emitted from the discharge arc in the whole peripheral direction progresses in the direction of the tube wall (progressive wave) and is reflected by the tube wall (reflected wave). If there is a difference in the displacement of these two compressional waves (progressive wave and reflected wave), the discharge arc should move to the position where the displacement of the two compressional waves becomes small.

When the waveform of the acoustic resonance frequency which is high frequency, particularly the waveform of the frequency f shown by the general formula (Equation 1) is supplied to the discharge lamp, at a position where the discharge arc has an equal distance against the tube wall in the center section orthogonal area used for the height of the section orthogonal area to the electrode axis of the discharge lamp (for example, the center of a circle, when the sectional shape including the height of the center section orthogonal area is circular), the displacement of the progressive wave and the reflected wave can be controlled always in the same level, and the discharge lamp can be stably lighted without causing movement of the discharge arc, as a result, the shape of the discharge arc is made straight. At this time, in the center section including the height of the section orthogonal area to the electrode axis of the discharge lamp, two compressional waves (progressive wave and reflected wave) interfere to cause a stationary wave. The conditions of the frequency to cause the stationary wave exist innumerably, but when only one node of the stationary wave (the point where the displacements of the progressive wave and the reflected wave become always the same level) exists, the discharge arc becomes stable. In the frequency where a plurality of nodes are present, the discharge arc is not stable.

As a result, the discharge arc is made stable and straight without causing fluctuations and discontinuance at the time of rated lighting of the discharge lamp, and without curving even if it is horizontally lighted, whereby the distance between the silica glass in the upper portion of the discharge space and the discharge arc becomes large, and the local temperature rise of the silica glass becomes small. Furthermore, the temperature of the coolest point in the lower portion of the discharge space rises.

Furthermore, by providing a lighting waveform having a frequency component of the acoustic resonance frequency which excites the mode to make the discharge arc straight, setting the lighting frequency right after lighting higher than the acoustic resonance frequency at the time of rated lighting, and amplifying the amplitude of the compressional wave emitted from the discharge arc during a period when the vapor pressure of the filler within the discharge space is low, the straight discharge arc can be always formed without causing fluctuations and bendings of the discharge arc during the whole lighting period including the initial stage of lighting of the discharge lamp. This is because the vapor pressure of the filler within the discharge space is low right after lighting of the discharge lamp, therefore the amplitude of the compressional wave emitted from the discharge arc becomes small, and in a section orthogonal area, the stationary wave is generated. However, since the amplitude change in the antinode of the stationary wave is small, the discharge arc cannot be stabilized in a straight state. But by amplifying the amplitude of the compressional wave emitted from the discharge arc during a period when the vapor pressure of the filler within the discharge space is low, the amplitude of the antinode of the stationary wave becomes large, whereby the discharge arc is stabilized and made straight in the node of the stationary wave.

Furthermore, by changing the amplitude of the compressional wave emitted from the discharge arc in the mode where the stationary wave is generated, the shape of the discharge arc is continuously changeable at least from the straight shape to the shape curved by the convection. When the discharge lamp is used in combination with a reflector, if the shape of the discharge arc is changed, there is caused a change in the luminous intensity distribution pattern.

Namely, a plurality of luminous intensity distribution patterns can be formed by changing the lighting waveform so as to change the amplitude of the compressional wave.

When the discharge lamp is used as a light source for vehicle headlights, if the passing beam is formed by the first luminous intensity distribution pattern and the travelling beam is formed by the second luminous intensity distribution pattern, the passing beam and the travelling beam can be switched between by one discharge lamp.

BRIEF DESCRIPTION OF THE DRAWINGS

FIG. 2 is a view showing the characteristic comparison result when a metal halide lamp B is lighted by a conventional discharge lamp-lighting apparatus and by a discharge lamp-lighting apparatus of the present invention.

FIG. 3 is a view showing the frequency range where the discharge arc is made straight at the time of rated lighting when a sine wave current waveform is supplied to the metal halide lamp A.

FIG. 12 (b) is a view showing the change of the lamp current effective value against the change of the lamp impedance from lighting of the metal halide lamp A to the rated lighting.

FIG. 14 (b) is a view of output waveform of the full bridge inverter circuit 64.

FIG. 16 (b) is a view showing the luminous intensity distribution direction at the time of forming the passing beam of said embodiment.

FIG. 17 (b) is a view showing the luminous intensity distribution direction at the time of forming the passing beam of said embodiment.

FIG. 18 (b) is a view showing the luminous intensity distribution pattern of the travelling beam.

FIG. 20 (a) is a view of the output voltage waveform of the step-down chopper circuit 116.

FIG. 20 (b) is a view of the output voltage waveform of the full bridge inverter circuit 104.

FIG. 21 (b) is a view showing the position of the discharge arc in the center section orthogonal area at XXIb—XXIb of FIG. 21(a) and the gas flow by the convection at the time of lighting the metal halide lamp 101 with the conventional discharge lamp-lighting apparatus.

FIG. 22 is a view showing the time change of the lamp current in a lighting system of the conventional discharge lamp.

PREFERRED EMBODIMENTS

Embodiments of the present invention will now be described. First, the experimental result when the discharge lamp is lighted with frequency $f$ (=$V/(2L)$), wherein $V$ represents the sound velocity in the discharge space medium, and $L$ represents the height of the center section orthogonal area determined by the general formula (Equation 1), which is the acoustic resonance frequency, will be described.

The discharge lamps used for the experiment are three types of metal halide lamps A, B and C. Metal halide lamp A is a lamp having a section including the electrode axis being in an ellipsoidal shape having a flat portion in the vicinity of the central portion between the electrodes, and section orthogonal areas having roughly circular discharge space. And metal halide lamps B and C are lamps having section areas parallel to the electrode axis being roughly oval (metal halide lamp has an oval shape close to circular shape), and a section orthogonal area having roughly circular discharge space, respectively.

Considering the shape of the section areas parallel to the electrode axis and the measured value of the height L of the section orthogonal area (since the section orthogonal area is circular, it is assumed to be the diameter of the circle), and the kinds of inclusion substance, the included amount thereof, the volume of the discharge space and the like, the values of the sound velocity V in the discharge space medium experimentally determined are shown in Table 1.

TABLE 1

| | Shape | Length of the discharge space L (mm) | Sound velocity in the discharge space medium V (m/s) |
|---|---|---|---|
| Metal halide lamp A | 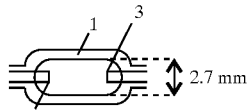 2.7 mm | 2.7 | 414 |
| Metal halide lamp B | 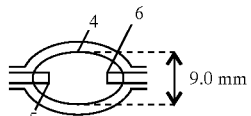 9.0 mm | 9.0 | 414 |
| Metal halide lamp C | 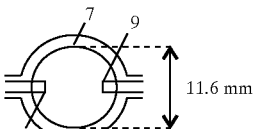 11.6 mm | 11.6 | 414 |

Incidentally, in the shape of the section orthogonal area in Table 1, 1 represents a silica glass forming the discharge space of the metal halide lamp A, 2 and 3 represent electrodes, and the discharge arc is generated between electrodes 2 and 3. A silica glass 4 forms the discharge space of the metal halide lamp B, 5 and 6 represent electrodes, and the discharge arc is generated between electrodes 5 and 6. Similarly 7 represents a silica glass forming the discharge space of the metal halide lamp C, 8 and 9 represent electrodes, and the discharge arc is generated between electrodes 8 and 9.

Furthermore, metal halide lamps A, B and C have the same sound velocity V in the discharge space medium, but different heights L for the section orthogonal area (different shapes of the discharge space).

The conditions shown in Table 1 are put in the general formula (Equation 1) to determine the lighting frequency f, and the result thereof is shown in Table 2.

TABLE 2

| Lighting frequency f determined by the general formula (Equation 1) | | |
|---|---|---|
| Metal halide lamp A | Metal halide lamp B | Metal halide lamp C |
| 76.7 kHz | 23.0 kHz | 17.8 kHz |

Figure 1:
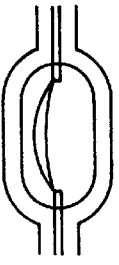
FIG. 1 is a view showing the characteristic comparison result when a metal halide lamp A is lighted by a conventional discharge lamp-lighting apparatus and by a discharge lamp-lighting apparatus of the present invention.

The shape of the discharge arc, the size of bending of the discharge arc (the distance between the electrode axis and the highest luminance point of the discharge arc in the section orthogonal area), the light-emitting efficiency, and the highest temperature on the upper surface and the lowest temperature of the lower surface of the silica glass when the sine wave current waveform of the lighting frequency f (76.6 kHz) shown in Table 2 is supplied to the metal halide lamp A to horizontally light it, and when the rectangular wave current waveform of 400 Hz is supplied to the metal halide lamp A to horizontally light it are compared and studied, and the result thereof is shown in FIG. 1. When the metal halide lamp A is lighted and operated with the sine wave current waveform of the lighting frequency of 76.7 kHz, it was lighted stably in a straight form of the discharge arc without causing any fluctuations and discontinuance of the discharge arc at the time of rated lighting for operation under the rated power condition, and with almost no bending of the discharge arc. In addition, in this experiment, the discharge arc is made straight stably in the frequency range of from 74.6 kHz to 77.7 kHz.

Furthermore, the comparison results of the shape of the discharge arc, the size of bending of the discharge arc, the light-emitting efficiency, and the highest temperature on the upper surface and the lowest temperature of the lower surface of the silica glass are shown in FIG. 2 when the sine wave current waveform and the triangular wave current waveform of the lighting frequency f (23.0 kHz) shown in Table 2 are supplied to the metal halide lamp B to horizontally light and operate it, and when the rectangular wave current waveform of 120 Hz is supplied to the metal halide lamp B to horizontally light and operate it. When the metal halide lamp B is lighted with the sine wave current waveform or the triangular wave current waveform of the lighting frequency of 23.0 kHz, it was lighted stably in a straight form of the discharge arc without causing any fluctuations and discontinuance of the discharge arc at the time of rated lighting for operation under the rated power condition, and with almost no bending of the discharge arc. In addition, in this experiment, the discharge arc is made straight stably in the frequency range of from 22.4 kHz to 23.7 kHz.

Furthermore, even if the sine wave current waveform of the lighting frequency f (17.8 kHz) shown in Table 2 is supplied to the metal halide lamp C to horizontally light and operate it, it was similarly lighted stably in a straight form of the discharge arc without causing any fluctuations and discontinuance of the discharge arc at the time of rated lighting.

As described above, when the discharge lamp is lighted with a rectangular wave lighting system, the shape of the discharge arc bends upward due to the action of the convection. On the contrary, when the sine wave current waveform or the triangular wave current waveform of the frequency f which is the acoustic resonance frequency determined by the general formula (Equation 1) is supplied to the discharge lamp, the shape of the discharge arc was stably maintained in a roughly straight shape during lighting. This is because the section orthogonal areas of metal halide lamps A, B and C are circular, and when each lamp is lighted and operated with the frequency f determined by the general formula (Equation 1), the compressional wave emitted in the whole peripheral direction from the discharge arc can control the displacement of the progressive wave and the reflected wave at the same level on the electrode axis which is the center of the circular section orthogonal area, whereby the discharge arc is made stable without being moved, and as a result, the discharge arc is located on the electrode axis at the center between the electrodes.

Moreover, when the metal halide lamps A, B and C are used by controlling the light arrangement in combination with a reflector, the discharge arc is generally arranged on the optical axis of the reflector. Since the shape of the discharge arc becomes one line, the shape of the discharge arc can be made roughly symmetrical in the upper and the lower portions against the optical axis of the reflector, and the shapes of the section areas of the discharge arc parallel to the optical axis of the reflector can be made identical in the direction of the whole periphery surrounding the optical axis. Therefore, the result that the necessary luminous intensity distribution characteristic is studied in one section area parallel to the optical axis of the reflector can be applicable to other section areas, which makes the design of the reflector very simple and symmetrical about the discharge arc. One possible shape for the reflector is shown in FIGS. 16–17 as elliptical.

Furthermore, from the characteristic comparison result shown in FIGS. 1 and 2, when the discharge arc bends upward and the discharge arc comes close to the upper portion of the silica glass, the temperature of the upper surface of the silica glass becomes higher than 950° C. and close to 1000° C. However, when respective metal halide lamps are lighted with the lighting frequency f shown in Table 2, the shape of the discharge arc becomes roughly straight, whereby the highest temperature on the upper surface of the silica glass can be lowered by 90°–105° C. Generally, the silica glass forming the metal halide lamps A, B and C rapidly deteriorate at a temperature close to 1000° C. causing devitrification or deformation (swelling) of the silica glass. But when the discharge lamp is lighted with the frequency f determined by the general formula (Equation 1), the highest temperature on the upper surface of the silica glass which is the portion where the temperature of the silica glass becomes the highest can be suppressed to 900° C. or below, whereby the deterioration of the silica glass can be suppressed and the life characteristic resulting from the devitrification and the deformation of the lamp can be greatly improved. Furthermore, when the shape of the discharge arc is made straight, the light-emitting efficiency can be improved by about 10%. The reason thereof is assumed to be that the coolest temperature point of the lamp is increased to raise the vapor pressure inside the discharge space, whereby the light-emitting efficiency is improved judging from the experiment results in which the lowest temperature on the lower surface of the silica glass is increased.

FIG. 3 is a view showing the experimental results of the frequency to make the discharge arc straight at the time of rated lighting when the sine wave current waveform is supplied to the metal halide lamp A was determined for four lamps. The diagonal line portions are the ranges where the discharge arc is made straight. Several ranges where the discharge arc is made straight exist in a range of 50 kHz to 150 kHz, but the range in which all the discharge arcs of the four discharge lamps are made straight in the widest range is in the vicinity of the frequency f determined by the general formula (Equation 1). The existence of the wide range and the existence of the common range make the design of the lighting circuit easy. Incidentally, the reason why the range where the discharge arc existing in the vicinity of 70 kHz to 80 kHz is made straight is slightly different for the four lamps is because of the difference in the height of the respective section orthogonal areas and the respective difference in the sound velocity in the discharge space medium due to the differences in the design parameters of each individual lamp.

Figure 4:
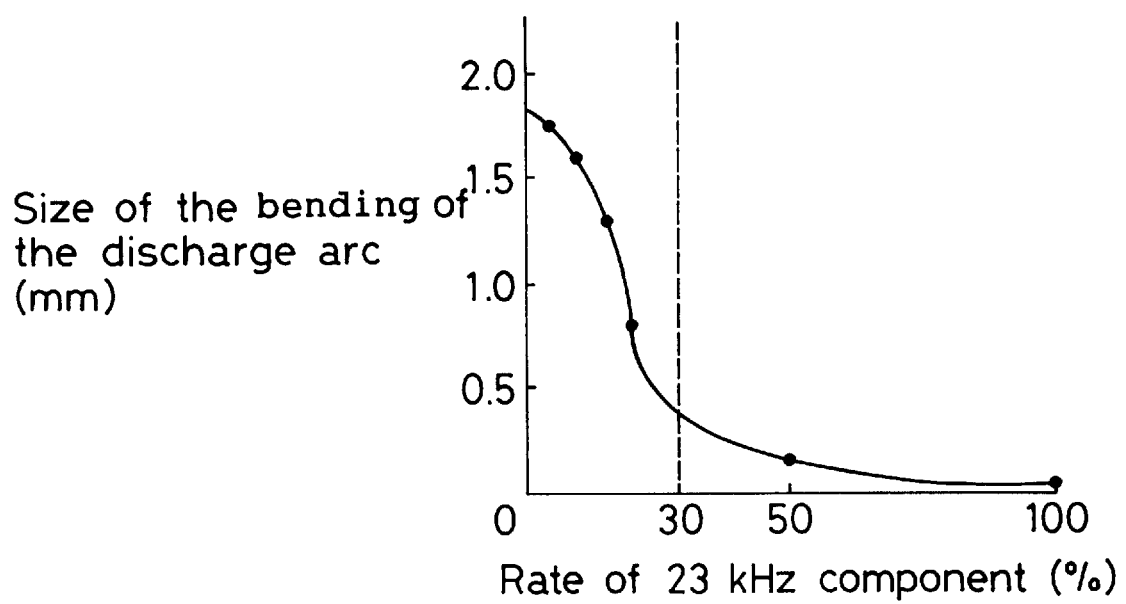
FIG. 4 is a view showing the relation between the rate of 23 kHz component of the waveform supplied to the metal halide lamp B and the size of bending of the discharge arc.

FIG. 4 is a result of an experiment which determines the relation of the rate of 23 kHz component and the size of bending of the discharge arc when a waveform having a frequency component of 23 kHz determined by the general formula (Equation 1) and another frequency component are supplied to the metal halide lamp B in a waveform having more than one frequency component. With the increase of the rate of 23 kHz component determined by the general formula (Equation 1) from FIG. 4, the bending of the discharge arc becomes small. Namely, as the rate of 23 kHz component increases, the shape of the discharge arc is made close to straight. Furthermore, it is found that if 23 kHz component is included in the rate of 30% or more, the bending of the discharge arc can be greatly reduced.

From the above experimental result of FIG. 4, by changing the lighting frequency in the predetermined range including 23 kHz which is the acoustic resonance frequency as determined by the general formula (Equation 1), it is possible to supply a waveform having a wide range of frequency components to the discharge lamp, though the rate of 23 kHz component is more or less decreased. The bending of the discharge arc can be greatly reduced within the range of changes of the lighting frequency supplied to the discharge lamp, even if the frequency f determined by the general formula (Equation 1) is varied due to changes to the discharge lamp (changes in the height of the section orthogonal area to the electrode axis of the discharge lamp and variance of the sound velocity V in the discharge space medium (scattering of included quantity of the inclusion substance, scattering of temperature and the like)). Moreover, if the waveform supplied to the discharge lamp is a waveform including the frequency component determined by the general formula (Equation 1), for example, not only a sine wave but also a triangular wave, sawtooth wave, stepped wave and the like can make the shape of the discharge arc roughly straight. Furthermore, by changing the rate of the frequency component determined by the general formula (Equation 1), it is possible to continuously change the shape of the discharge arc from a straight form to a form curved by the convection.

Figure 5:
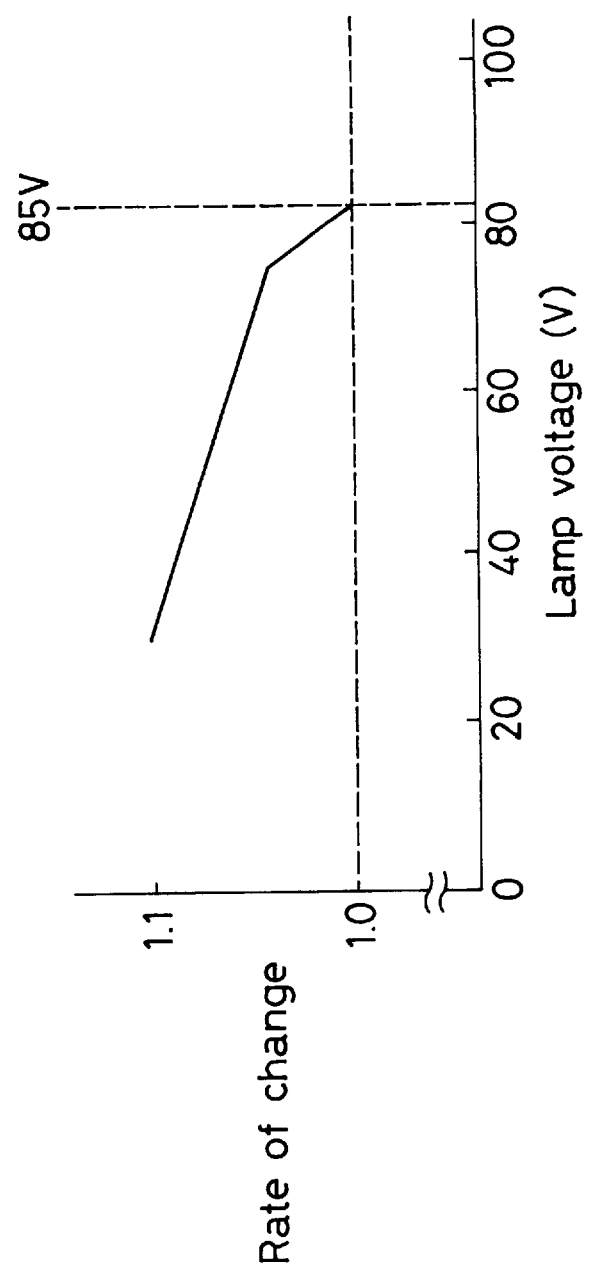
FIG. 5 is a view showing the rate of change of the sound velocity in the discharge space medium against the change of the lamp voltage of the metal halide lamp A.
Figure 6:
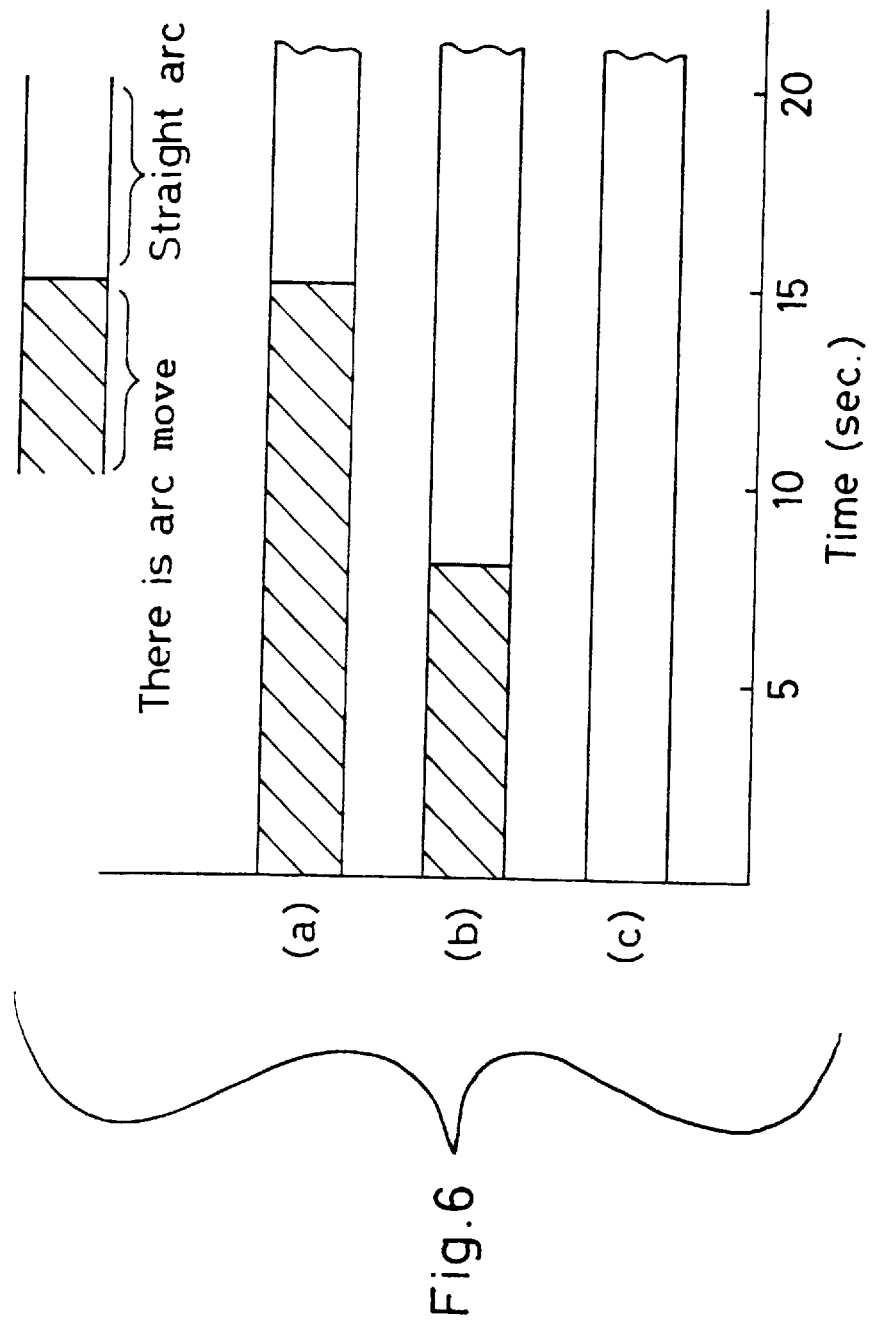
FIG. 6 is a view showing the result that the change of the shape of the discharge arc at the time of lighting the metal halide lamp A with the sine wave current waveform is measured and evaluated.

FIG. 5 is a view showing the rate of change of the sound velocity in the discharge space medium against the change of the lamp voltage of the metal halide lamp A to be experimented and studied (the sound velocity at the time of rated lighting is assumed to be 1). The lamp voltage right after lighting is small and rises with the lapse of time. Incidentally, the lamp voltage at the time of rated lighting is 85V. The sound velocity and the acoustic resonance frequency are in the proportional relation, as described in the Paper of J. Appl. Phys 49 (5), May 1978, pp. 2680–2683. Therefore, the acoustic resonance frequency which excites the mode to make the discharge arc straight changes in the characteristic shown in FIG. 5. Namely, the acoustic resonance frequency has a characteristic that it drops before reaching the rated lighting after being lighted and started. Incidentally, the frequency that the discharge arc becomes straight at the time of rated lighting is 76.7 kHz. FIG. 6 shows the results that the change of the shape of discharge arc is measured and evaluated, when the metal halide lamp A is lighted with a sine wave current waveform. It shows the results when the metal halide lamp A is lighted with a certain lighting frequency (76.7 kHz) and with a certain lamp current (rated lamp current 0.4 A) (FIG. 6(*a*)), when it is lighted with a certain lamp current (rated lamp current 0.4 A) while changing the frequency with the characteristic shown in FIG. 5 (FIG. 6(*b*)), and when the lamp current larger than the rated lamp current is supplied right after lighting, and reduced continuously to the rated value while changing the frequency with the characteristic shown in FIG. 5 (FIG. 6(*c*)). Under the conditions of FIG. 6(*a*), though stable and straight discharge arc could not be obtained due to the large movement of the discharge arc for about 15 seconds in the initial stage of lighting, but thereafter a stable and straight discharge arc could be obtained. Under the conditions of FIG. 6(*b*), the move of the discharge arc in the initial stage of lighting becomes small, and the period to be moved becomes short. And under the conditions of FIG. 6(c), straight discharge arc could be always maintained without causing moves and bendings of the discharge arc during the whole period of lighting. It is preferred to supply the current of about 3 times as large as the rated lamp current, to obtain the stable and straight discharge arc from immediately after lighting.

The phenomenon to make the discharge arc straight occurs when the force to make the discharge arc straight by the excitation of the acoustic resonance is larger than the buoyancy to bend the discharge arc which is generated by the convection. In order to avoid moves and bendings of the discharge arc at the initial stage of lighting and to form stable and straight discharge arc, first it is effective to lower the lighting frequency until the rated lighting is reached after lighting. Second, it is effective to make the lamp current not less than the rated lamp current immediately after lighting and amplify the amplitude of the compressional wave emitted from the discharge arc at the initial stage of lighting in order to make the excitation level of the acoustic resonance large, since at the initial stage of lighting the vapor pressure of the filler in the discharge space is low and the amplitude of the compressional wave emitted from the discharge arc is small to make the excitation level of the acoustic resonance small, thereby the force to make the discharge arc straight is small.

Concrete embodiments will now be described.

Figure 7:
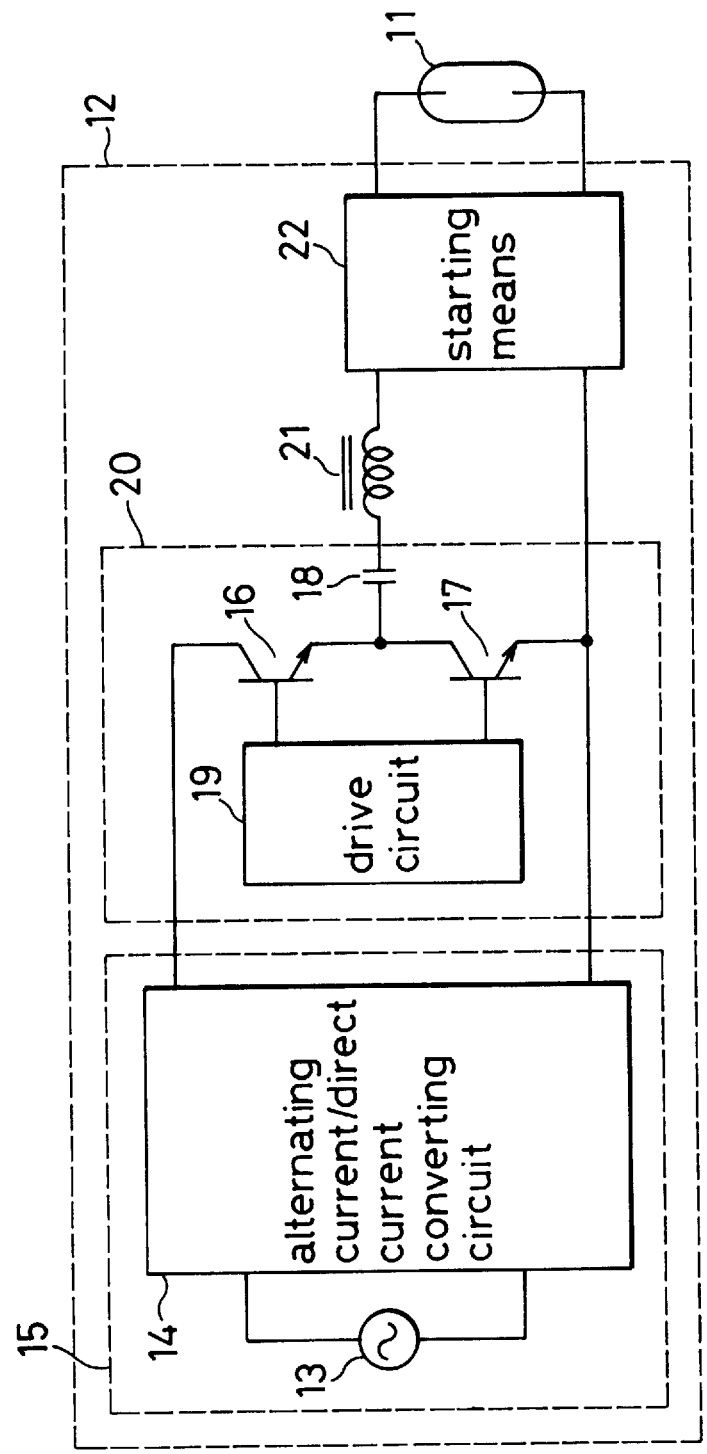
FIG. 7 is a structural view of the discharge lamp-lighting apparatus of the first embodiment of the present invention.

Concrete structure of the first embodiment of the discharge lamp-lighting apparatus which lights the discharge lamp with the acoustic resonance frequency, particularly the frequency determined by the general formula (Equation 1) is shown in FIG. 7.

Referring to FIG. 7, 11 represents a metal halide lamp A as the discharge lamp, and the metal halide lamp A 11 is a discharge lamp provided with a glass envelope defining the discharge space in which mercury, sodium iodine, and scandium iodine, which are metal halide, are sealed therein as fillers, and it is horizontally lighted. A lighting circuit 12 is for starting, lighting, and operating the metal halide lamp A 11. The lighting circuit 12 acts as a ballast circuit for the metal halide lamp A 11. The lighting circuit 12 includes a direct-current power supply 15 composed of a commercial-use alternating-current power supply 13 and an alternating current-direct current converting circuit 14 for converting the output of the alternating-current power supply 13 to direct current, a series inverter circuit 20, and a starting means 22. The inverter circuit 20 is an inverter circuit composed of transistors 16 and 17, a condenser 18 and a drive circuit 19 for controlling ON/OFF of transistors 16 and 17 and converting the output of the direct-current power supply 15 to the alternating current, and a choke coil 21 which is a reactor to limit the lamp current of the metal halide lamp A 11 to the rated current. The starting means 22 generates a high voltage pulse for starting the metal halide lamp A 11. The starting means 22 has a structure that generation of the high voltage pulse is stopped when the metal halide lamp A 11 is lighted. Furthermore, the drive circuit 19 has a structure that the ON/OFF switching of the transistors 16 and 17 are controlled so that the frequency of the alternating current output from the series inverter circuit 20 becomes 76.7 kHz which is determined by the general formula (Equation 1), which is the acoustic resonance frequency.

Figure 8:
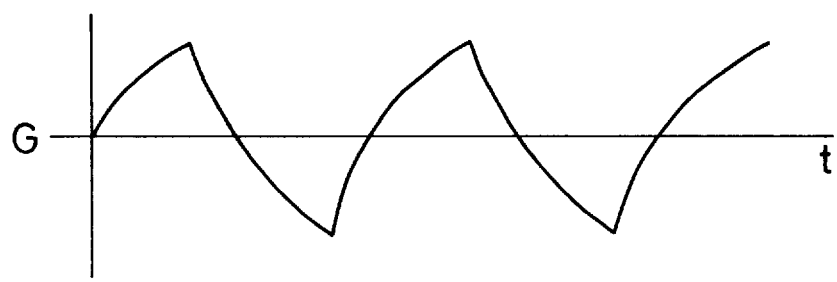
FIG. 8 is a view of the lamp current waveform of the first embodiment of the present invention.

With the structure described above, after converting the output of the alternating-current power supply 13 to direct current by the direct current-alternating current converting circuit 14, the series inverter circuit 20 outputs the alternating current of 76.7 kHz by controlling the ON/OFF switching of transistors 16 and 17 with the output signal of the drive circuit 19. Until the metal halide lamp A 11 is lighted, the high voltage pulse is applied to the metal halide lamp A 11 from the starting means 22, and when the metal halide lamp A 11 is lighted, the metal halide lamp A 11 keeps being lit by using a certain alternating-current output of 76.7 kHz in the series inverter circuit 20 as a power source, the current being restricted by the choke coil 21. FIG. 8 shows the lamp current waveform when the metal halide lamp A 11 is lighted at the rated power condition. A current waveform close to the triangle wave waveform of 76.7 kHz is supplied to the metal halide lamp A 11. When the discharge arc at this time is observed, there are fluctuations in the discharge arc for about 15 seconds right after lighting, thereafter the shape of the discharge arc becomes straight and the discharge lamp was stably lighted with the size of the bending of the discharge arc being 0.05 mm, similar to the shape of the discharge arc when the sine wave waveform of 76.7 kHz determined by the above-mentioned experiment is applied, without causing any fluctuation or discontinuance of the discharge arc.

As described above, since the shape of the discharge arc can be made roughly straight during the lighting period excluding the initial stage of lighting with the structure of the first embodiment, the temperature of the upper portion of the silica glass drops reducing the amount of deterioration possible, that is devitrification and deformation (swelling) of the silica glass due to softening can be prevented, whereby the life of the metal halide lamp A 11 can be greatly improved. The light-emitting efficiency can be also increased. Furthermore, when the discharge lamp is used in combination with the reflector to control the light arrangement, the design of the reflector is made very simple. Moreover, it becomes possible to light the discharge lamp with very high frequency of 76.7 kHz allowing the current-limiting function of the metal halide lamp A 11 to be constituted with a very small choke coil 21. The structure of the lighting circuit is made simple to make the lighting circuit smaller, lighter, and cheaper.

Figure 9:
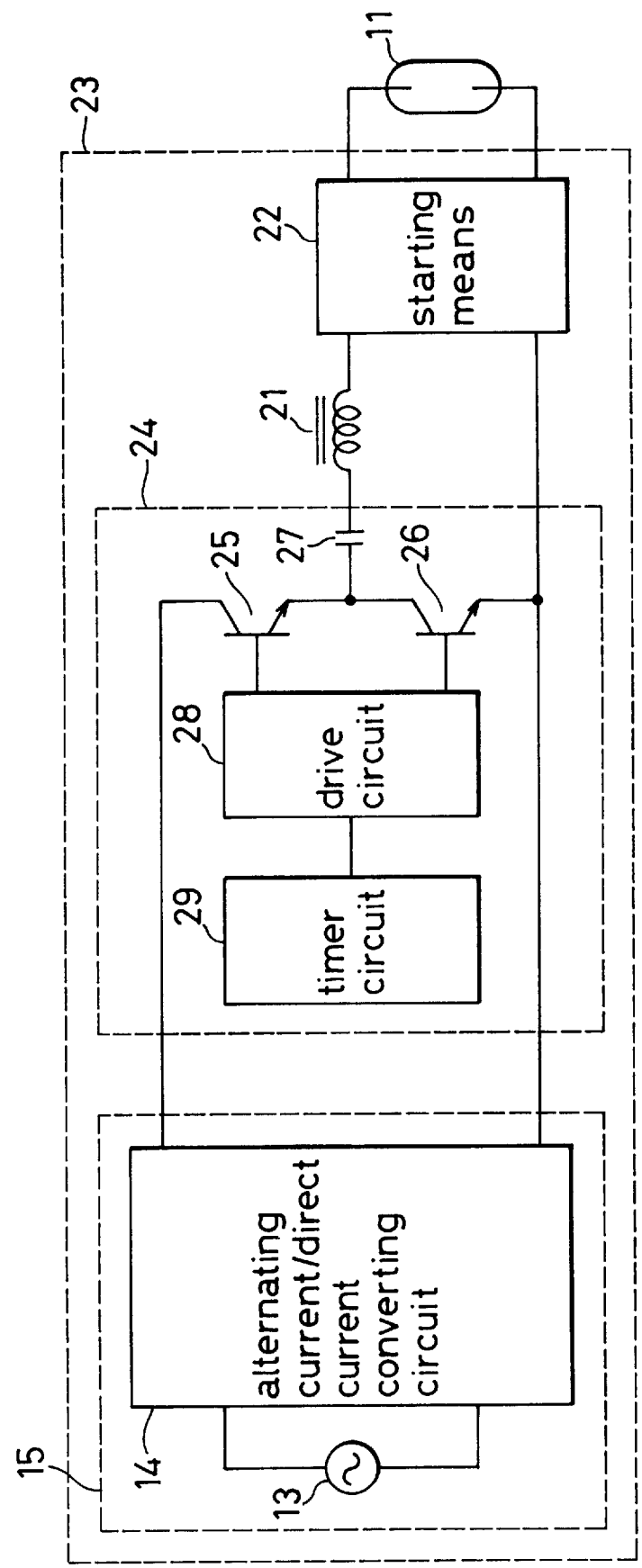
FIG. 9 is a structural view of the discharge lamp-lighting apparatus of the second embodiment of the present invention.

Next, the second embodiment of the present invention will be described. The concrete structure of the second embodiment is shown in FIG. 9. Referring to FIG. 9, the metal halide lamp A 11, the direct-current power supply composed of a commercial-use alternating-current power supply 13, an alternating current-direct current converting circuit 14 for converting the output of the alternating-current power supply 13 to the direct current, the choke coil 21, and the starting means 22 are similar to those of the first embodiment. The difference from the first embodiment is the structure of the series inverter circuit 24 which is the inverter circuit portion of the lighting circuit 23. The series inverter circuit 24 is composed of transistors 25 and 26, a condenser 27, a drive circuit 28 for controlling the ON/OFF switching of transistors 25 and 26, and a timer circuit 29 which outputs a signal according to the time since the lighting circuit 23 started its operation (which is substantially equal to the time since the metal halide lamp A 11 is lighted). The drive circuit 28 and the timer circuit 29 are so constituted that the frequency for controlling the ON/OFF switching of transistors 25 and 26 can be changed by the drive circuit 28 according to the output signal of the timer circuit 29. At the initial stage of lighting of the metal halide lamp A 11, the ON/OFF switching of the transistors 25 and 26 are controlled so that the alternating-current output of a frequency lower than 76.7 kHz is outputted from the series inverter circuit 24, but the lighting frequency is gradually increased with the lapse of time. At the time of rated lighting of the metal halide lamp A 11, the ON/OFF switching of the transistors 25 and 26 are controlled so that the alternating-current lighting frequency output from the series inverter circuit 24 becomes 76.7 kHz which is the acoustic resonance frequency, that is, the one determined by the general formula (Equation 1). In addition, the choke coil 21 is made to have such inductance that it becomes the rated lamp current at the time of-rated lighting of 76.7 kHz of the metal halide lamp A 11.

With the structure described above, a high voltage pulse is applied to the metal halide lamp A 11 from the starting means 22 until the metal halide lamp A 11 is lighted. When the metal halide lamp A 11 is lighted, the metal halide lamp A 11 remains lit by using the alternating-current output of the series inverter circuit 24 as a power source, the current being restricted by the choke coil 21. At this time, at the initial stage of lighting of the metal halide lamp A 11, the frequency becomes lower than 76.7 kHz, therefore the impedance of the choke coil 21 becomes small, and the current higher than the rated lamp current is supplied to the metal halide lamp A 11, and the lighting frequency rises gradually up to 76.7 kHz with the lapse of time of lighting, whereby the lamp current decreases to the rated lamp current with a predetermined gradient. Furthermore, the alternating-current frequency output from the series inverter circuit 24 becomes 76.7 kHz which is the acoustic resonance frequency, determined by the general formula (Equation 1), at the time of the rated lighting of the metal halide lamp A 11. With such a structure, the current larger than the rated lamp current is made to flow at the initial stage of lighting of the metal halide lamp A 11, thereby it is possible to rise rapidly the light output of the metal halide lamp A 11 up to the rated lighting value. Furthermore, at the time of rated lighting, the shape of the discharge arc is made straight, therefore the similar effects can be obtained as those of the first embodiment. Moreover, since the time reaching the rated lighting is made short, the time when the discharge arc moves at the initial stage of lighting can be made short, whereby the discharge arc is rapidly made straight.

Figure 10:
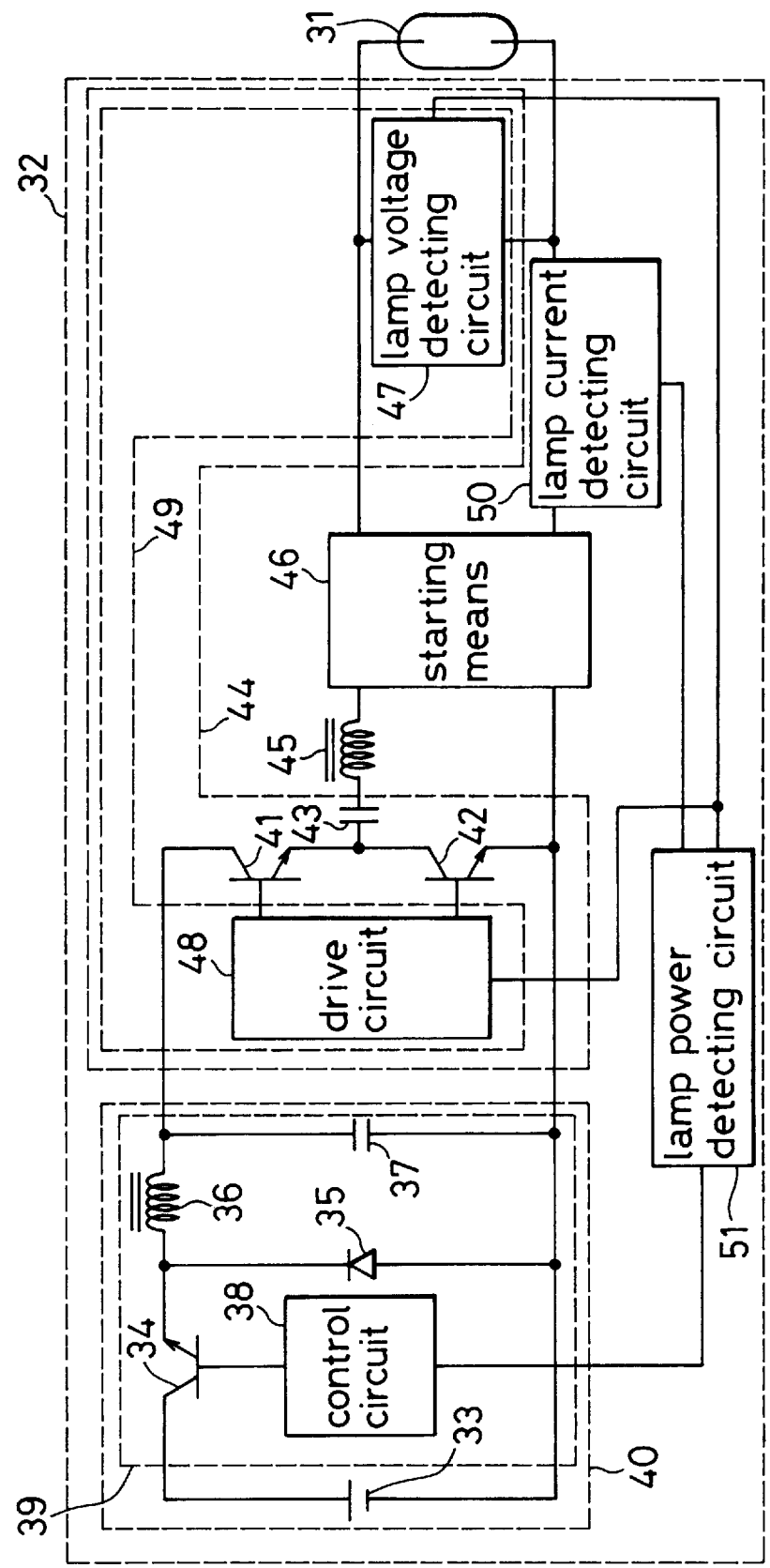
FIG. 10 is a structural view of the discharge lamp-lighting apparatus of the third embodiment of the present invention.

Next, the third embodiment of the present invention will be described. The concrete structure of the third embodiment is shown in FIG. 10. Referring to FIG. 10, 31 represents a metal halide lamp A as the discharge lamp, and the metal halide lamp A is horizontally lighted. A lighting circuit 32 for starting and lighting the metal halide lamp A 31 is composed of a direct-current power supply A 40 which can change the output voltage, a series inverter circuit 44 which is an inverter circuit A for converting the output of the direct-current power supply A 40 to the alternating current of the acoustic resonance frequency, a choke coil 45 which is a reactor restricting the lamp current of the metal halide lamp A 31, a starting means 46 for generating the high voltage pulse for starting the metal halide lamp A 31, a lamp current detecting circuit 50 for detecting the lamp current value supplied to the metal halide lamp A 31, and a lamp power detecting circuit 51 for detecting the lamp power value supplied to the metal halide lamp A 31. The direct-current power supply A 40 is composed of a battery 33 and a step-down chopper circuit 39. The step-down chopper circuit 39 is composed of a transistor 34 which inputs the output of the battery 33 and can change the output voltage for controlling the lamp power supplied to the metal halide lamp A 31 to a predetermined value, a diode 35, a choke coil 36, a condenser 37, and a control circuit 38 for outputting the control signal for controlling the ON/OFF switching of the transistor 34. Furthermore, the series inverter circuit 34 is composed of a control means 49 which includes a lamp voltage detecting circuit 47 for detecting the lamp voltage which is the lamp characteristics of the metal halide lamp A 31 and a drive circuit 48 which has such a structure to control the lighting frequency so that the lamp voltage becomes lowest, transistors 41 and 42 whose ON/OFF switching is controlled by the output signal of the drive circuit 48, and a condenser 43. The series inverter circuit 34 receives the output of the direct-current power supply A 40 to convert it to the alternating current of the frequency in which the lamp voltage becomes lowest and outputs it. Furthermore, the lamp power detecting circuit 51 has such a structure that receives a signal proportional to the lamp voltage which is the output signal of the lamp voltage detecting circuit 47 and a signal proportional to the lamp current which is the output signal of the lamp current detecting circuit 50, and calculates the lamp power. The control circuit 38 receives the output signal of the lamp power detecting circuit 51 to control the ON/OFF switching of the transistor 34. Incidentally, the starting means 45 has such a structure that when the metal halide lamp A 31 is lighted, it stops the generation of the high voltage pulse. Furthermore, the choke coil 45 has such inductance as to become the rated lamp current when the metal halide lamp A 31 is subjected to the rated lighting.

With the structure described above, when the metal halide lamp A 31 is lighted with the high voltage pulse generated from the starting means 46, the starting means 46 stops the operation. After the metal halide lamp A 31 is lighted, the current waveform close to the triangular wave similar to that of the first embodiment is supplied from the series inverter circuit 44 to the metal halide lamp A 31 to maintain the lighting. At this time, the lighting frequency of the series inverter circuit 44 is controlled so that the lamp voltage becomes lowest. It is when the discharge length becomes shortest that the lamp voltage becomes lowest, and when the shape of the discharge arc becomes straight, the lamp voltage becomes lowest. By utilizing these characteristics, if the lighting frequency is controlled so that the lamp voltage becomes lowest, the discharge lamp can be always lighted with the lighting frequency determined by the general formula (Equation 1) which is the acoustic resonance frequency.

Here, the characteristics included in the sound velocity in the discharge space medium of the metal halide lamp A 31 will be described. The sound velocity V in the discharge space medium is determined by the filled substance in the lamp, the temperature in the discharge space and the like, and as the general formula, the following Equation 2 is known.

$$V = \sqrt{\frac{\gamma RT}{M}} \qquad \text{Equation 2}$$

$\gamma$ = constant pressure specific heat/constant volume specific heat
$R$ = gas constant
$T$ = temperature in the discharge space
$M$ = average atomic weight of the inclusion substance If the average temperature in the discharge space is changed, the sound velocity V changes. Namely, the lamp current can be changed to dim, and during the initial stage of lighting until the average temperature in the discharge space reaches the temperature at the time of rated lighting, the average sound velocity in the discharge space differs from the sound velocity at the time of the rated lighting. Also, it is clear that when the filled substance and the filled amount thereof in the metal halide lamp A 31 is changed, the sound velocity V in the discharge space changes, and the sound velocity in the discharge space has a peculiar value determined by the lamp and the lighting conditions. Furthermore, when scattering is caused in the individual lamp, the frequency determined by the general formula (Equation 1) is changed, therefore the output frequency of the series inverter circuit 44 is changed by the control means 49. Accordingly, the impedance of the choke coil 45 is changed to change the lamp voltage supplied to the metal halide lamp A 31. However, since it is possible to detect the lamp power by the lamp power detecting circuit 51 to control the ON/OFF switcing of the transistor 34 with the control circuit 38, and to change the output voltage of the step-down chopper circuit 39, the lamp power can be controlled to a predetermined value, even if scattering and changes are caused in the sound velocity in the discharge space medium and the height of the section orthogonal area to the electrode axis due to the production scattering and the age softening in the same type of lamps, and scattering and changes are caused in the lighting frequency determined by the general formula (Equation 1).

Figure 11:
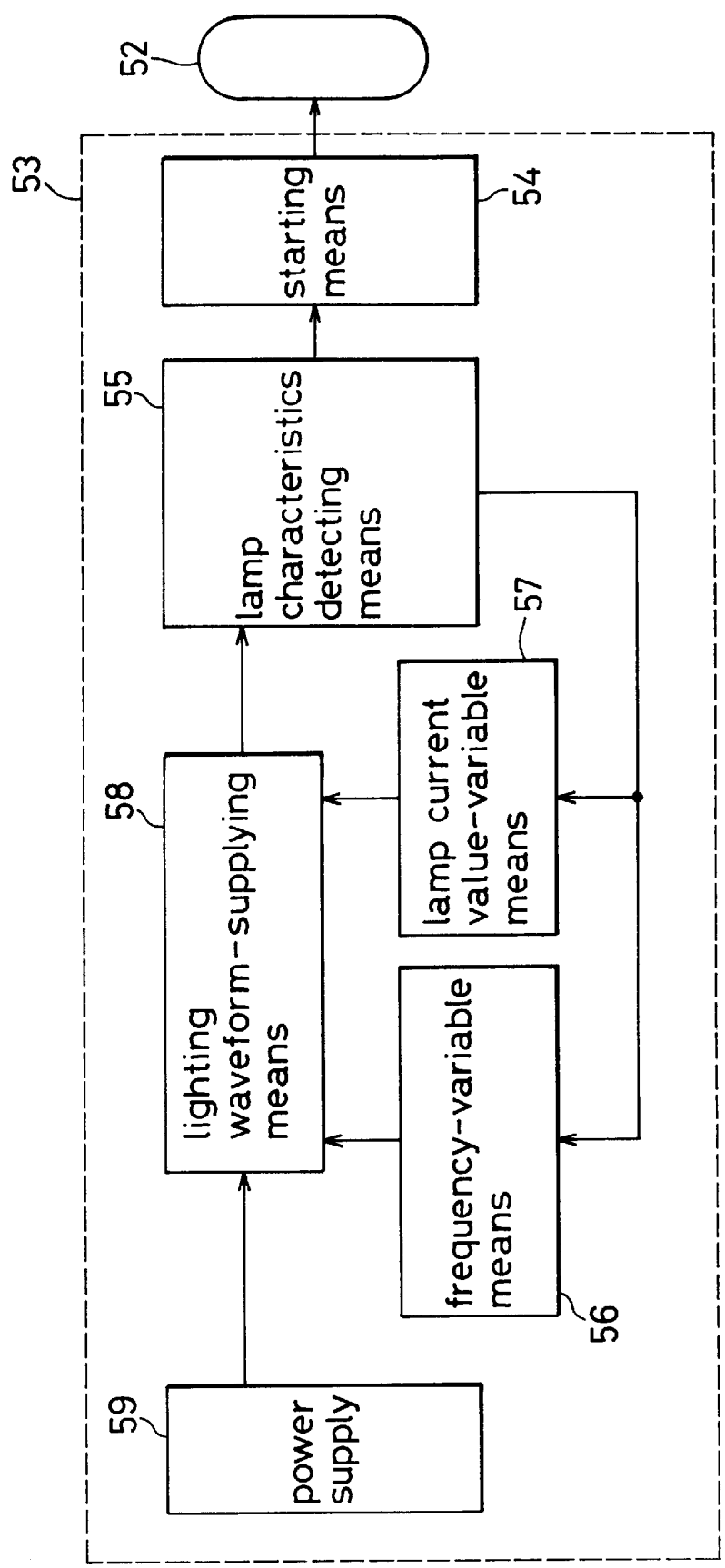
FIG. 11 is a block diagram of the discharge lamp-lighting apparatus of the fourth embodiment of the present invention.
Figure 12:
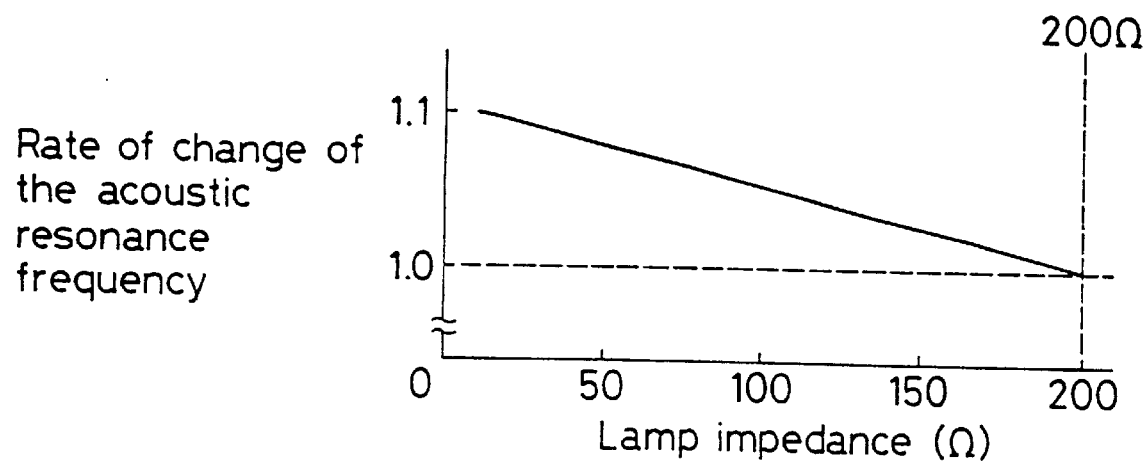
FIG. 12 (a) is a view showing the rate of change of the acoustic resonance frequency against the change of the lamp impedance from lighting of the metal halide lamp A to the rated lighting.
Figure 12:
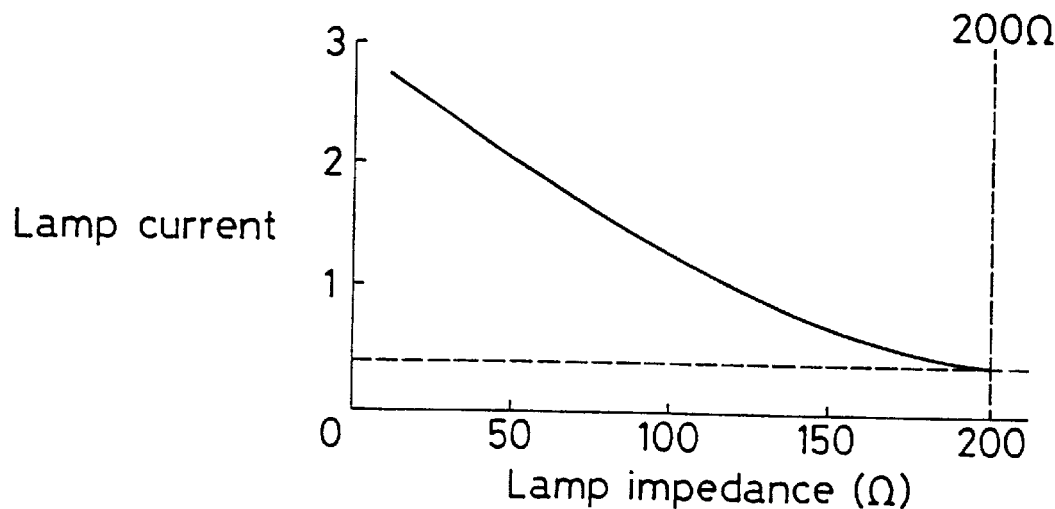

Next, the fourth embodiment of the present invention will be described. FIG. 11 is a block diagram showing the structure of the fourth embodiment. Referring to FIG. 11, 52 represents the metal halide lamp A described above. A lighting circuit 53 supplies a predetermined waveform to the metal halide lamp A 52 to light it. The lighting circuit 53 is composed of a starting means 54 which applies sufficient voltage to the metal halide lamp A 52 to start the discharge of the metal halide lamp A 52, a lamp characteristics detecting means 55 for detecting the lamp impedance which is the lamp characteristics of the metal halide lamp A 52, a frequency-variable means 56 to determine the frequency of the lamp current by selecting a lighting waveform for operating the discharge lamp having the frequency component of the acoustic resonance frequency which excites the mode to make the discharge arc straight, a lamp current value-variable means 57 to determine the effective value of the lamp current by selecting a lighting waveform to amplify the amplitude of the compressional wave emitted from the discharge arc, a lighting waveform-supplying means 58 for supplying the lamp current waveform having the frequency and effective value determined by the frequency-variable means 56 and the lamp current value-variable means 57, respectively, to the metal halide lamp A 52, and a power supply 59 which supplies the power to the lighting waveform supplying means 58. The frequency-variable means 56 and the lamp current value-variable means 57 have such a structure that the lamp current waveform is determined to have the predetermined frequency and the effective value according to the change of the lamp impedance detected by the lamp characteristics detecting means 55. The lamp current waveform supplied to the metal halide lamp A 52 is the alternating-current waveform, for example, a sine wave or a triangular wave, in which the instantaneous value always changes so that the compressional wave is generated from the discharge arc. FIGS. 12(*a*) and 12(*b*) show the result of the rate of change of the acoustic resonance frequency to make the discharge arc straight against the change of the lamp impedance before the rated lighting after the metal halide lamp A 52 is lighted (FIG. 12(*a*)) determined from experiments, and the change of the lamp current effective value against the change of the lamp impedance (FIG. 12(*b*)). The lamp impedance immediately after lighting is small and rises with the lapse of time of lighting. Incidentally, the lamp impedance at the time of the rated lighting is 200Ω. As is seen from FIG. 12(*a*), the acoustic resonance frequency drops with a predetermined gradient until it reaches the rated lighting after the metal halide lamp A 52 is lighted. Incidentally, the acoustic resonance frequency to make the discharge arc straight at the time of rated lighting is about 76.7 kHz as in the above-mentioned embodiment. The frequency-variable means 56 changes the lighting frequency according to the change of the lamp impedance detected by the lamp characteristics detecting means 55 so as to have the relation shown in FIG. 12(*a*). Also at the same time, the lamp current value-variable means 57 changes the effective value of the lamp current according to the change of the lamp impedance detected by the lamp characteristics detecting means 55 so as to have the relation shown in FIG. 12(*b*).

With the structure described above, when the metal halide lamp A 52 is lighted, the lamp impedance rises gradually from a low level to 200Ω, which is the lamp impedance at the time of rated lighting. The lamp current waveform according to the lamp impedance detected by the lamp characteristics detecting means 55 is supplied to the metal halide lamp A 52. At this time, the supplied lamp current waveform has such a structure that the lighting frequency drops until it reaches the rated lighting after the metal halide lamp A 52 is lighted, in the same way as the changes of the acoustic resonance frequency to make the discharge arc straight. A current larger than the rated lamp current is supplied at the initial stage of lighting when the vapor pressure of the filler in the discharge space is low to amplify the amplitude of the compressional wave emitted from the discharge arc, whereby the excitation level of the acoustic resonance is made large. The metal halide lamp A 52 can form and maintain the straight discharge arc during the whole lighting period (from immediately after lighting to the rated lighting). Since there is no period when bendings and moves are caused in the discharge arc, the long life of the discharge lamp can be obtained, as well as the light-emitting efficiency at the initial stage of lighting is improved. When the discharge lamp is used in combination with the reflector, the luminous intensity distribution characteristics can be made roughly constant during the whole lighting period. In addition, in order to amplify the amplitude of the compressional wave to make the discharge arc stable and straight immediately after lighting, it is enough to supply a current three times the rated lamp current immediately after lighting and to reduce it to the rated lamp current in response to the rise of the lamp impedance. In order, however, to speed up the rise of the light output as well as to control the output to be roughly constant after the light output reaches the rated value, a current 6 to 7 times the rated lamp current is supplied right after lighting to change the lamp current effective value with the characteristics shown in FIG. 12(*b*), in which the lamp current is continuously reduced to the rated impedance. Furthermore, when the metal halide lamp A 52 is lighted with the characteristics shown in FIGS. 12(*a*) and 12(*b*), the time to reach the rated lighting after being lighted (the time until the lamp impedance reaches 200Ω) is about 30 seconds, and the light output reaches the rated lighting value about 5 seconds after being lighted.

Figure 13:
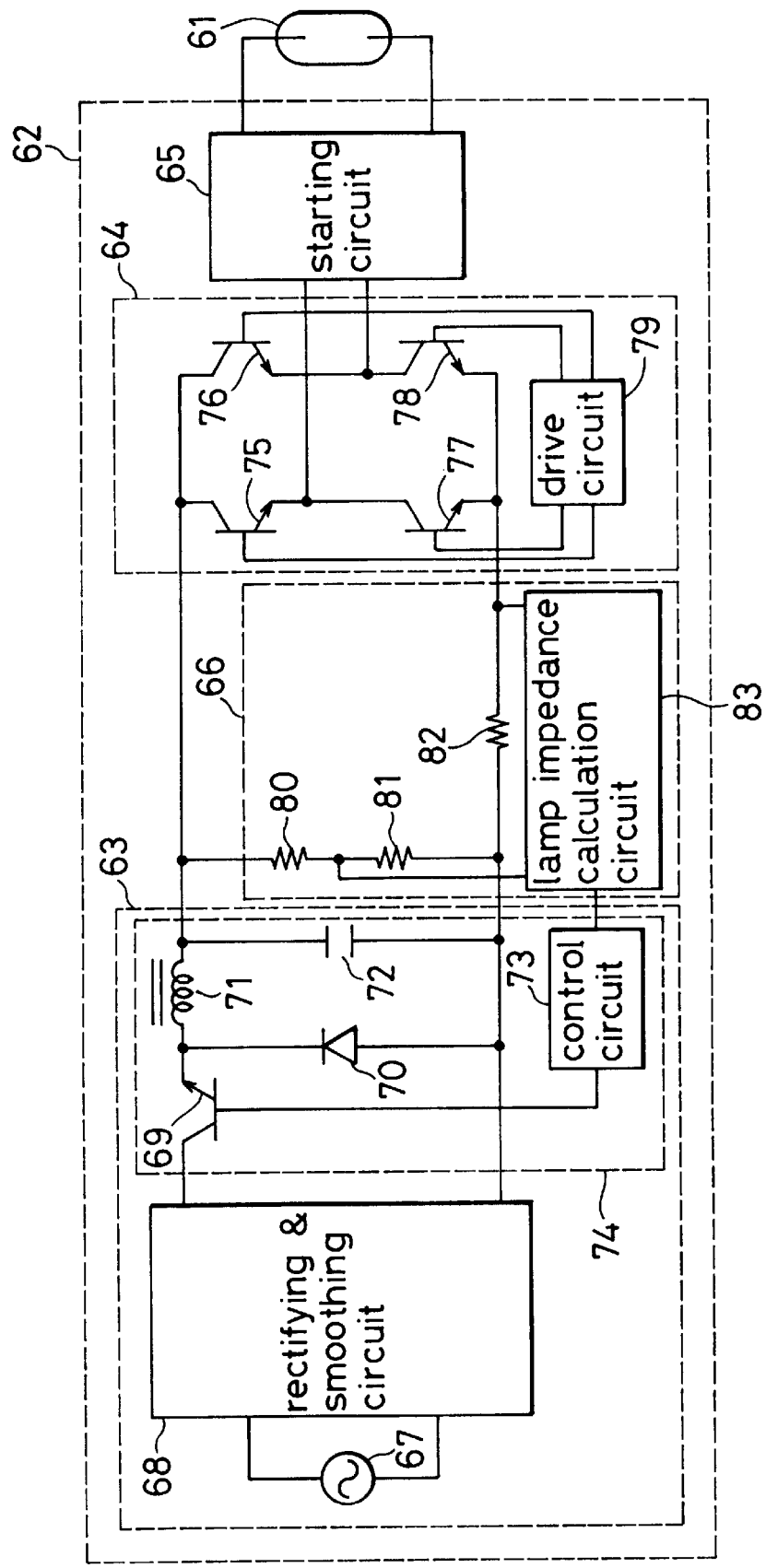
FIG. 13 is a structural view of the discharge lamp-lighting apparatus of the fifth embodiment of the present invention.
Figure 14A:
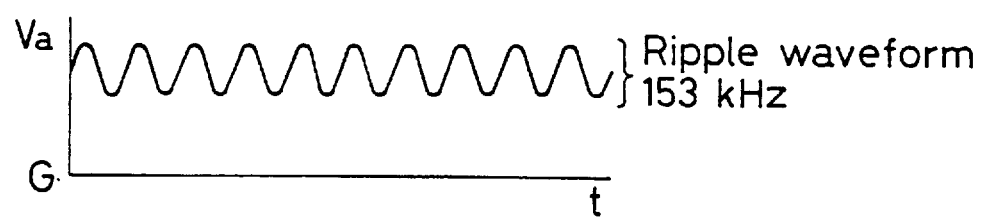
FIG. 14 (a) is a view of output waveform of the step-down chopper circuit 74.
Figure 14B:
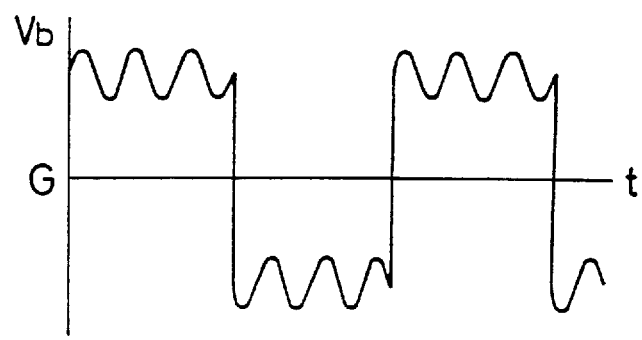

The concrete structure of the fifth embodiment of the present invention is shown in FIG. 13. Referring to FIG. 13, 61 represents a metal halide lamp A as the discharge lamp, and 62 represents a lighting circuit for supplying the predetermined lighting waveform to the metal halide lamp A 61 to light it. The lighting circuit 62 is composed of a direct-current power supply B 63 which outputs the direct current superimposed with a ripple waveform having the frequency component of the acoustic resonance frequency which excites the mode to make the discharge arc straight, a full bridge inverter circuit 64 which is an inverter circuit B to convert the output of the direct-current power supply B 63 to the alternating current, a starting means 65, and a lamp impedance detecting circuit 66 which is a lamp characteristics detecting means to detect the lamp impedance which is the lamp characteristics of the metal halide lamp A 61. The direct-current power supply B 63 is composed of a commercial-use alternating-current power supply 67, a rectifying and smoothing circuit 68 for rectifying and smoothing the output of the alternating-current power supply 67 and converting it into direct current, and a step-down chopper circuit 74 for converting the output of the rectifying and smoothing circuit 68 to the direct current superimposed with a ripple waveform having the frequency component of the acoustic resonance frequency. The step-down chopper circuit 74 is composed of a transistor 69 which is a switching element, a diode 70, a choke coil 71, a condenser 72, and a control circuit 73 for controlling the ON/OFF switching of the transistor 69. The full bridge inverter circuit 64 is composed of transistors 75, 76, 77 and 78, and a drive circuit 79. By alternately generating the period when transistors 75 and 78 are turned ON and the period when transistors 76 and 77 are turned ON by the output signal of the drive circuit 79, the output of the step-down chopper circuit 74 is converted to an alternating current of 400 Hz and is supplied to the metal halide lamp A 61. Furthermore, the lamp impedance detecting circuit 66 is composed of resistors 80, 81 and 82, and a lamp impedance calculation circuit 83. A signal proportional to the lamp voltage is detected by the resistors 80 and 81, and a signal proportional to the lamp current is detected by the resistor 82, and from these two signals, the lamp impedance is calculated by the lamp impedance calculation circuit 83. According to the lamp impedance calculation result, the control circuit 73 outputs the signal to control the ON/OFF switching of the transistor 69. Furthermore, the choke coil 71 and the condenser 72 have the role of filtering which smoothes the output of the step-down chopper circuit 74. However, in the present embodiment, smoothing is not performed completely, and the step-down chopper circuit 74 outputs the waveform in which the ripple waveform is superimposed on the direct component, therefore the inductance of the choke coil 71 or the capacity of the condenser 72 is made small. As a result, the output waveform of the step-down chopper circuit 74 becomes as shown in FIG. 14(*a*), and the output waveform of the full bridge inverter circuit 64 becomes the one converted to the alternating current of 400 Hz, as shown in FIG. 14(*b*). The starting means 65 has a structure that a high voltage pulse is applied in order to start the metal halide lamp A 61. The output waveform of the step-down chopper circuit 74 is such that only the frequency of the ripple waveform is variable when the ON/OFF period of the transistor 69 is changed, and when the ratio of the ON period is changed, the level of the direct-current component becomes variable. Incidentally, if the acoustic resonance effect is compared for the case of the alternating-current and the case when the alternating current is superimposed on the direct current, in the case of the alternating current, the lamp power is modulated with a frequency twice the alternating current; while in the case that the alternating current is superimposed on the direct current, the power is modulated with the same frequency as the alternating current, therefore the frequency of the ripple waveform in the present invention is required to be twice what is present in the above-mentioned embodiment. Namely, in the present embodiment, the frequency of the ripple waveform in which the discharge arc is made straight at the time of rated lighting of the metal halide lamp A 61 is about 153 kHz. Therefore, the ON/OFF period of the transistor 69 is set to be about 153 kHz at the time of rated lighting of the metal halide lamp A 61, and the ON/OFF period of the transistor 69 is changed so as to have the characteristics shown in FIG. 12(*a*) in response to the change of the lamp impedance. At the same time, the ratio of the ON period of the transistor 69 is changed so that effective value of the lamp current has the characteristics shown in FIG. 12(*b*) in response to the change of the lamp impedance.

With the structure described above, when the metal halide lamp A 61 is lighted with the high voltage pulse generated from the starting means 65, the lamp impedance detecting circuit 66 calculates the lamp impedance, and the cycle of the ON/OFF period and ON period of the transistor 69 is changed so as to be the characteristics shown in FIGS. 12(*a*) and 12(*b*), in response to the change of the lamp impedance to light the metal halide lamp A 61. At this time, since the values of the inductance of the choke coil 71 and the capacity of the condenser 72 are not changed during the whole lighting period as the lamp impedance decreases, the amplitude of the ripple waveform becomes large. As a result, when the lamp impedance is small at the initial stage of lighting, the modulation depth of the ripple waveform component becomes large, and the modulation depth decreases with the increase of the lamp impedance. Incidentally, the inductance of the choke coil 71 and the capacity of the condenser 72 are set to the predetermined values so that the modulation depth in which the discharge arc is made straight at the time of rated lighting of the metal halide lamp A 61 can be secured. As a result, the frequency of the ripple waveform which excites the mode to make the discharge arc straight is reduced, similarly as the change of the acoustic resonance frequency, until it reaches the rated lighting, and at the initial stage of lighting where the vapor pressure of the filler is low, the lamp current having large modulation depth of the ripple waveform is supplied to amplify the amplitude of the compressional wave. As a result, the metal halide lamp A 61 can form and maintain the straight discharge arc during the whole lighting period (from right after lighting to rated lighting), whereby the similar effect as in the fourth embodiment can be realized.

Furthermore, in the present embodiment, since the effective value of the lamp current is determined by the alternating-current component of 400 Hz, there is an advantage that the modulation depth can be freely set by the choke coil 71 and the condenser 72, irrespective of the size of the effective value of the lamp current. And even in the discharge lamp which cannot form the straight discharge arc at the time of rated lighting because the excitation level of the acoustic resonance is small against the buoyancy generated by the convection at the time of being lighted with a sine wave current waveform, the modulation depth can be made large to make the excitation level of the acoustic resonance large, whereby the straight discharge arc can be formed. Furthermore, even if the effective value of the lamp current is not made large, only the modulation depth can be changed to be made large, therefore the damage of the discharge lamp becomes small and the life of the discharge lamp can be made long. Furthermore, by changing the rate of the 153 kHz component, the bending of the discharge arc can be controlled. Namely, as the inductance of the choke coil 71 or the capacity of the condenser 72 becomes small, the rate of the 153 kHz component becomes large and the bending of the discharge arc is made smaller. Therefore, for example, if an inductance-variable means is provided to the choke coil 71 or a capacity-variable means is provided to the condenser 72, the shape of the discharge arc can be changed, and when it is used in combination with a reflector, the luminous intensity distribution patterns of the light output can be changed.

Figure 15:
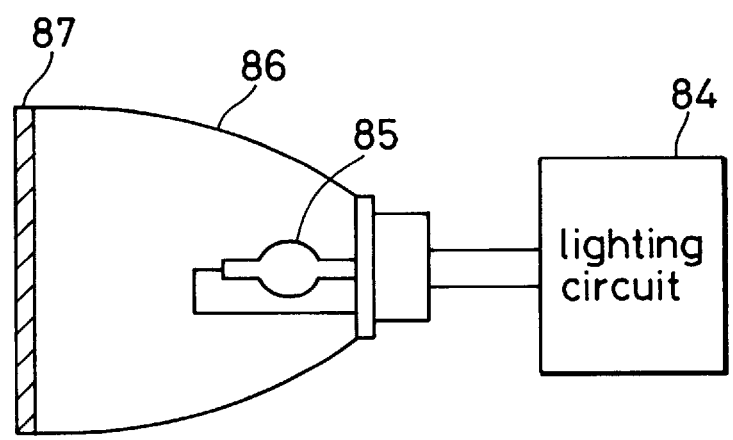
FIG. 15 is a structural view of a vehicle headlight of the sixth embodiment of the present invention.

The sixth embodiment of the present invention will now be described. FIG. 15 shows the structural view of the discharge lamp-lighting apparatus in the sixth embodiment of the present invention, wherein the discharge lamp-lighting apparatus of the present invention is used as vehicle headlights.

Referring to FIG. 15, 85 represents a metal halide lamp A as the discharge lamp, and 84 represents a lighting circuit for starting and lighting the metal halide lamp A 85. A parabolic reflector 86 irradiates the light emitted from the metal halide lamp A 85 to the forward direction, and 87 represents an outer lens to control the light arrangement. The parabolic reflector 86 and the outer lens 87 constitute the light control means which irradiates the light emitted from the metal halide lamp A 85 in the predetermined direction. The lighting circuit 84 has a function which can switch the lamp current waveform supplied to the metal halide lamp A 85 to the sine wave of 76.7 kHz and the rectangular wave of 400 Hz. And at the time of 76.7 kHz, the shape of the discharge arc becomes roughly straight as described above, and at the time of the rectangular wave of 400 Hz, the discharge arc has a curved shape due to the influence of the convection.

Figure 16A:
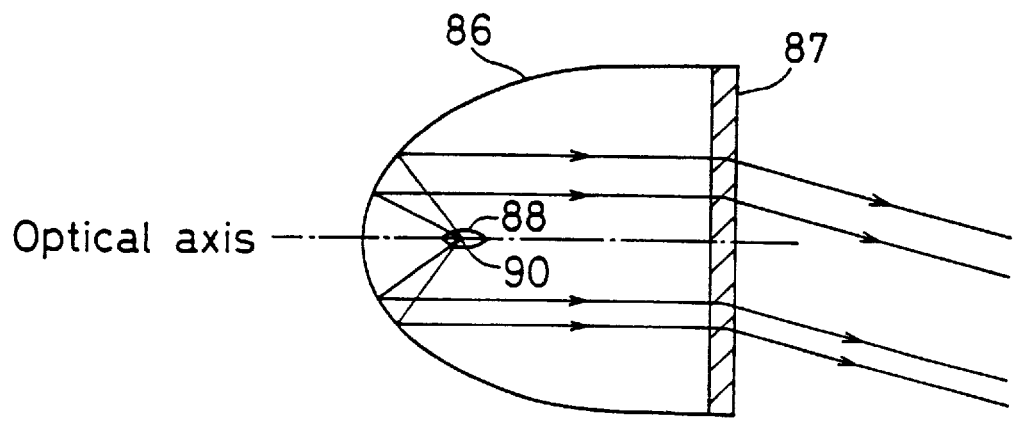
FIG. 16 (a) is a view showing the luminous intensity distribution direction at the time of forming the travelling beam of said embodiment.
Figure 16B:
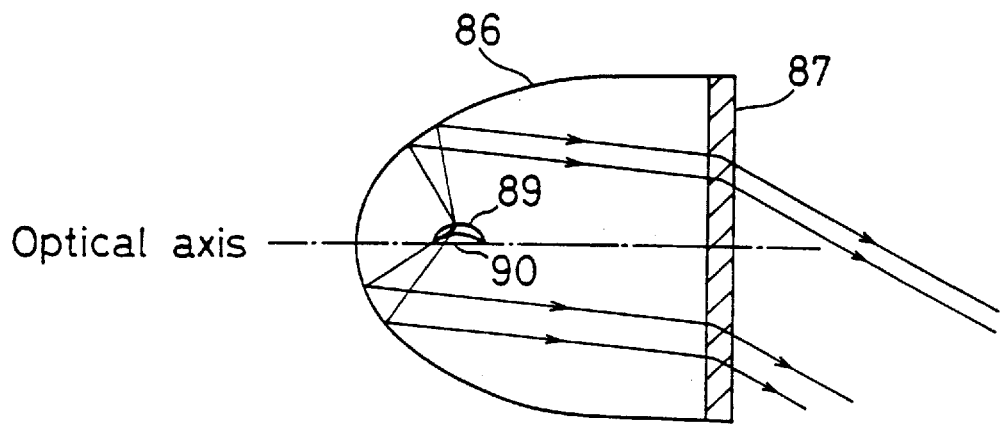
Figure 18A:
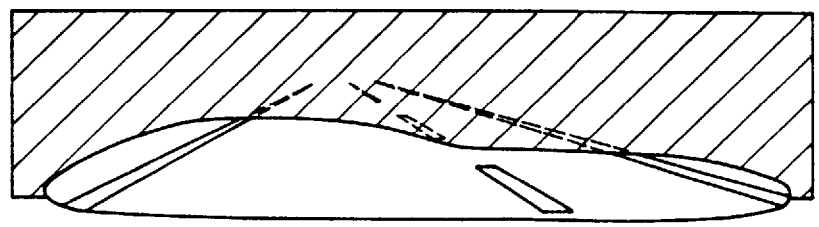
FIG. 18 (a) is a view showing the luminous intensity distribution pattern of the passing beam.
Figure 18B:
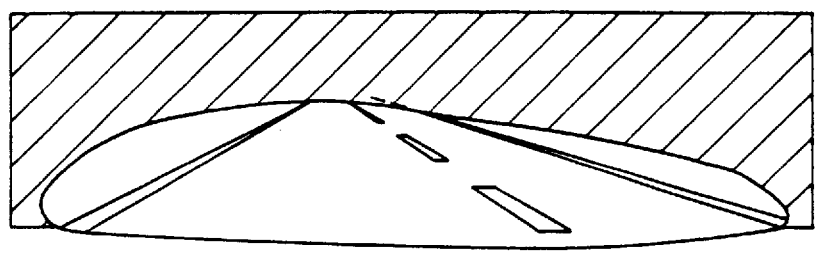
Figure 19:
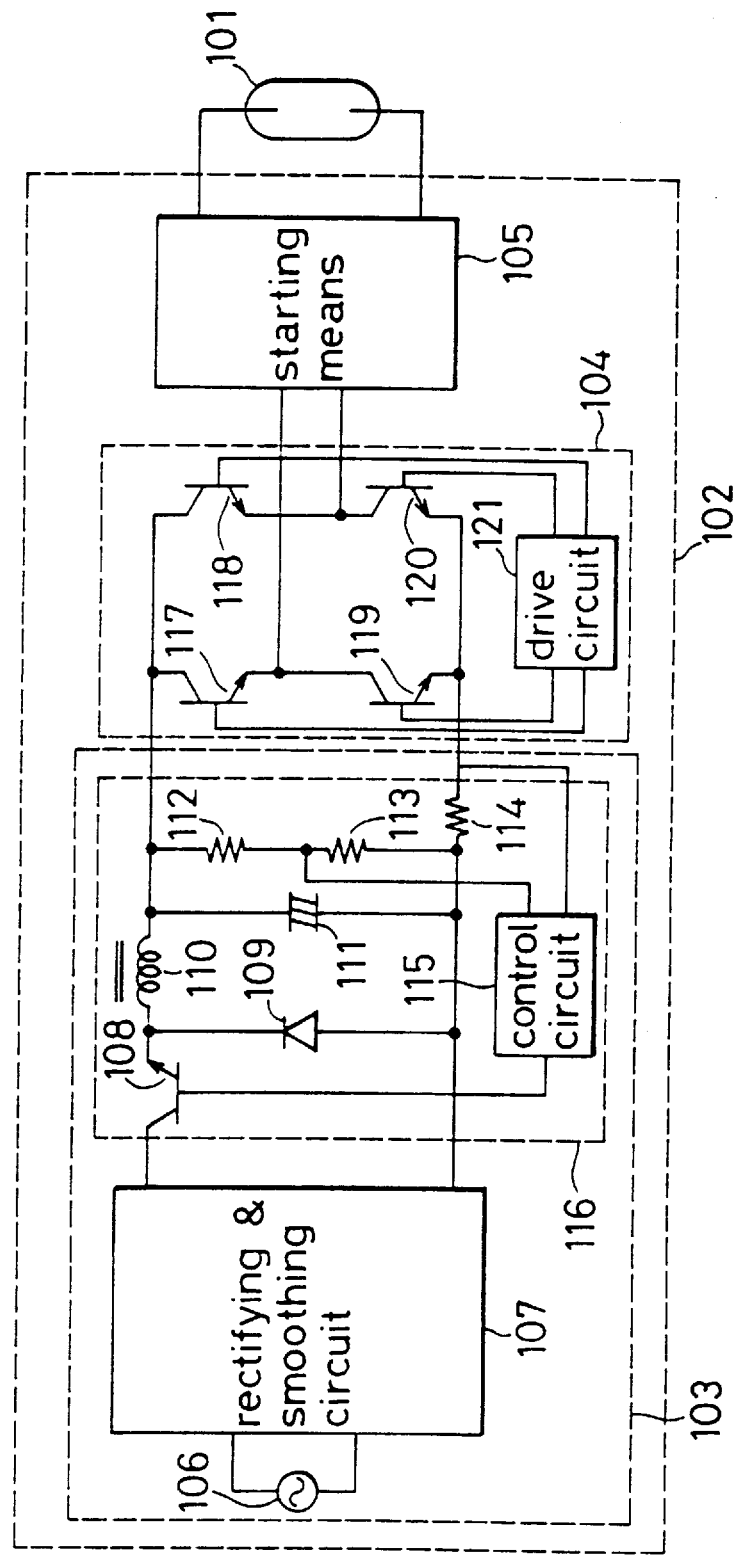
FIG. 19 is a structural view of the discharge lamp-lighting apparatus of the conventional embodiment.
Figure 21A:
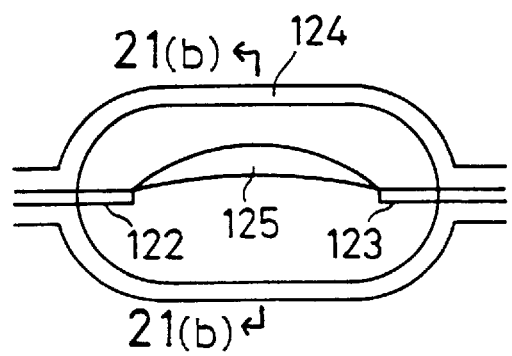
FIG. 21 (a) is a shape view of the discharge arc at the time of lighting the metal halide lamp 101 with the conventional discharge lamp-lighting apparatus.
Figure 21B:
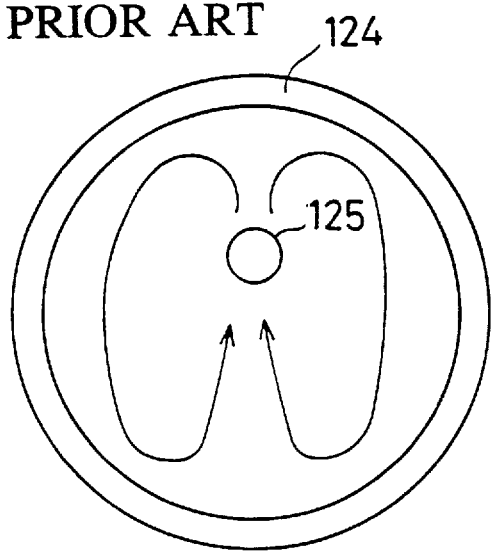

The operation thereof will be described below. First, the case where the beam frequently used is the travelling beam will be described. The arrangement of the discharge arc 88 and 89 of metal halide lamp A 85, the parabolic reflector 86 and the outer lens 87 is shown in FIGS. 16(a) and 16(b). FIG. 16(a) shows the case where the lamp current waveform is a sine wave of 76.7 kHz, wherein the discharge arc 88 is almost in the straight form. FIG. 16(b) shows the case where the lamp current waveform is a rectangular wave of 400 Hz, wherein the discharge arc 89 is in a curved form. Furthermore, the direction of light irradiation is shown by arrows. The metal halide lamp A 85 is arranged so that the central portion between electrodes of the metal halide lamp A 85 coincides with the focal point 90 of the parabolic reflector 86. With the structure described above, when the metal halide lamp A 85 is lighted with the sine wave of 76.7 kHz, as shown in FIG. 16(a), the focal point 90 of the parabolic reflector 86 becomes substantially the center of the discharge arc, and the light emitted from the discharge arc which is the light-emitting portion is reflected by the parabolic reflector 86 to become roughly parallel light with the optical axis, and is projected in a predetermined direction by the outer lens 87 to form the luminous intensity distribution pattern of the travelling beam, as shown in FIG. 18(b). Furthermore, when the metal halide lamp A 85 is lighted with the rectangular wave of 400 Hz, the discharge arc is curved, and as shown in FIG. 16(b), is located in the upper portion of the focal point 90 of the parabolic reflector 86, whereby the light reflected by the parabolic reflector 86 becomes the light directing toward downward with respect to the optical axis, and the light is projected by the outer lens 86 to form the luminous intensity distribution pattern of the passing beam, as shown in FIG. 18(a).

Figure 17A:
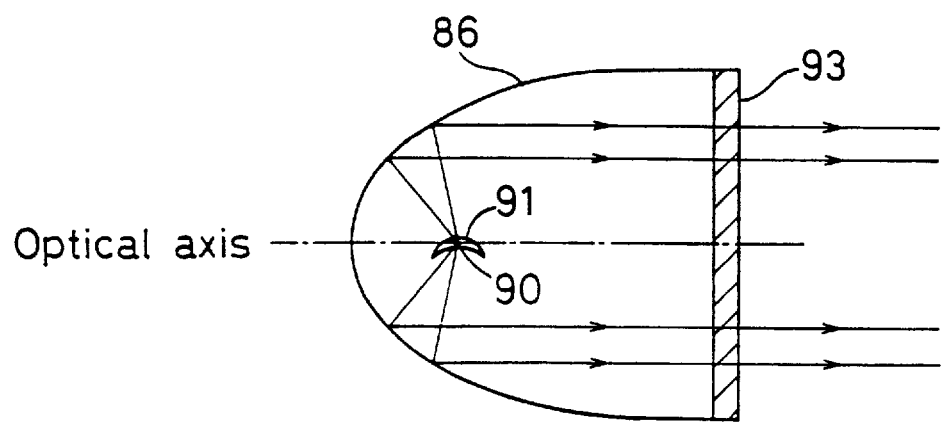
FIG. 17 (a) is a view showing the luminous intensity distribution direction at the time of forming the travelling beam of said embodiment.
Figure 17B:
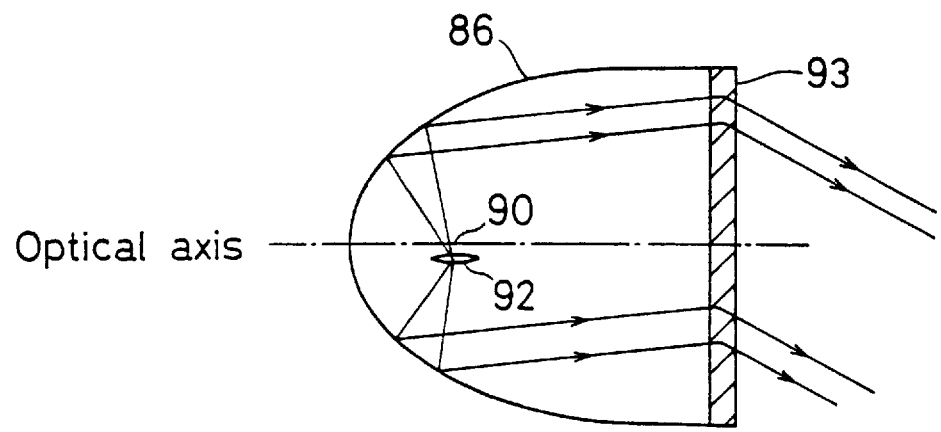

Next, the case where the beam frequently used is the passing beam will be described as shown in FIGS. 17(a) and 17(b). The arrangement of the discharge arc 91 and 92 of the metal halide lamp A 85, the parabolic reflector 86 and the outer lens 83 differing from the outer lens 87 of FIGS. 16(a) and 16(b) are shown in FIGS. 17(a) and 17(b). FIG. 17(a) shows the case where the lamp current waveform is a rectangular wave of 400 Hz, and FIG. 17(b) shows the case where the lamp current waveform is a sine wave of 76.7 kHz, and the direction of the light irradiation is shown by arrows. And the metal halide lamp A 85 is arranged so that the focal point 90 of the parabolic reflector 86 is located at the point where the discharge arc at the time of lighting with the rectangular wave of 400 Hz is present in the section orthogonal area of the metal halide lamp A 85.

With the structure described above, when the metal halide lamp A 85 is lighted with the rectangular wave of 400 Hz, the focal point 90 of the parabolic reflector 86 becomes substantially the center of the discharge arc, as shown in FIG. 17(a). The light emitted from the discharge arc which is the light-emitting portion is reflected by the parabolic reflector 86 to become substantially parallel light with the optical axis, and is projected in a predetermined direction by the outer lens 93 to form the luminous intensity distribution pattern of the travelling beam, as shown in FIG. 18(b). Furthermore, when the metal halide lamp A 85 is lighted with the sine wave of 76.7 kHz, the discharge arc is made straight, therefore the position of the discharge arc which is the light emitting portion comes to the lower portion of the focal point 90 of the parabolic reflector 86, whereby the light reflected by the parabolic reflector becomes the light directed upward as shown in FIG. 17(b), and the light is inverted and projected by the outer lens 93 to form the luminous intensity distribution pattern of the passing beam, as shown in FIG. 18(a).

As described above, according to the sixth embodiment, by changing the lighting waveform, switching between the passing beam and the travelling beam is possible, and vehicle headlights which can switch between the passing beam and the travelling beam with one discharge lamp can be realized. Furthermore, if it is set so as to become the straight discharge arc when it is the beam frequently used, devitrification and deformation (swelling) of the discharge lamp which is the cause of deterioration of the luminous flux and the limit-emitting characteristics can be suppressed, and the long life of the lamp can be realized.

Incidentally, in the above embodiments, the metal halide lamps A, B and C are horizontally lighted, but they may be lighted vertically, or lighted in an optional direction. Even if they are lighted in any direction, by lighting with the frequency which is the acoustic resonance frequency, and particularly the one determined by the general formula (Equation 1), when the discharge arc is in a position with equal distance to the tube wall in the section orthogonal area (for example, when the shape of the section orthogonal area in the discharge space is circular, the center of the circle). The displacement of the progressive wave and the reflected wave can be controlled to the same level in the vicinity thereof including the discharge arc. The discharge arc becomes stable without being moved and the metal halide lamp can be lighted stably without causing any fluctuation and discontinuance of the discharge arc.

Furthermore, the height of the section orthogonal area is made to be the diameter of the circular section orthogonal area including the center between the electrodes of the discharge lamp, but if it is the diameter of the circular section orthogonal area not including the center between the electrodes, the discharge arc comes to the center of the section orthogonal area. Therefore the bending of the discharge arc can be made small, and the metal halide lamp can be stably lighted without causing any fluctuation and discontinuance of the discharge arc.

Furthermore, the discharge lamp having the discharge space having a section orthogonal area including the electrode axis in an ellipsoidal shape, or roughly oval shape is used, but it may be circular, or quadrilateral form such as rectangular and square. If it is circular, at the center of the section orthogonal area including the center between electrodes, the displacement of not only the compressional wave on the section orthogonal area, but also the compressional wave emitted in all directions (progressive wave) and all the compressional waves reflected by the tube wall and returned (reflected wave) can be controlled to the same level. Therefore the force to fix the discharge arc in the center of the section orthogonal area becomes large, and the shape of the discharge arc can be made straight more stably. Furthermore, if it is a quadrilateral form such as rectangle and square, the height of the section orthogonal area becomes constant, therefore the discharge arc is located in the center of the section orthogonal areas, whereby the shape of the discharge arc can be made straight more stably.

Furthermore, the waveform supplied to the discharge lamp may be any waveform so long as it has the frequency component of the acoustic resonance frequency, particularly the one determined by the general formula (Equation 1), for example, not only the sine wave, the triangular wave, but also the sawtooth wave, the stepped wave, the exponential wave, and the complex wave thereof. If they are waveforms including the frequency component of the acoustic resonance frequency, particularly the one determined by the general formula (Equation 1), the bending of the discharge arc can be made small and the shape of the discharge arc can be made straight, or a shape close to straight.

Furthermore, as the discharge lamp, a metal halide lamp is used, but other HID lamps such as high-pressure mercury-vapor lamp and high-pressure sodium-vapor lamp may be used, and low-pressure discharge lamp such as fluorescent lamp and low-pressure sodium-vapor lamp may be also used so long as it is the one in which the compressional wave is generated in the discharge space. Particularly, it is effective for the discharge lamp which is a short-arced and small-sized metal halide lamp in which the mercury pressure is increased and high-pressure xenon is present, wherein xenon gas having cold-temperature pressure of at least 3 atm or higher, mercury and metal halide in an amount of from 0.02 mg to 0.5 mg are sealed as a filler within the glass envelope defining the discharge space of not more than 0.2 cm$^3$ and the discharge lamp has at least sodium and scandium as the metal.

Furthermore, the material forming the discharge space of the metal halide lamps A, B and C is silica glass, but it may be ceramic materials or soda glass. And whatever material forming the discharge space of the discharge lamp may be, when the discharge lamp is lighted with the lighting frequency of high frequency (acoustic resonance frequency), it can be lighted stably without causing any fluctuation and discontinuance of the discharge arc.

Furthermore, in the first and the second embodiments, the direct-current power supply 15 has such a structure that the output of the commercial-use alternating current 13 is converted to the direct current by the alternating current-direct current converting circuit 14, it may have a structure that switching power supply is added to the commercial-use alternating-current power supply or the direct-current power supply or may be a battery.

Furthermore, in the third embodiment, the direct-current power supply 40 which can change the output voltage is composed of the battery 30 and the step-down chopper circuit 39, but other structures may be used, so long as the structure detects the lamp power of the discharge lamp and the output voltage can be changed so that the predetermined lamp power is supplied.

Furthermore, in the first and the second embodiments, the series inverter circuits 20 and 24 may have other structures, so long as they can convert the direct current to the alternating-current waveform having at least the acoustic resonance frequency component, such as a half bridge circuit, a full bridge circuit, an one-stone inverter circuit and the like. Furthermore, the series inverter circuit 24 has such a structure that the timer circuit 29 detects the operation time of the lighting circuit in order to supply a current larger than the rated lamp current immediately after lighting of the discharge lamp, and reduces the lamp current with a predetermined gradient with the lapse of time after lighting. The operational frequency of the drive circuit 28 is gradually increased from low frequency by the output to change the impedance of the choke coil 21 gradually from a small value to a large value, and the lamp current is reduced with a predetermined gradient with the lapse of time after lighting. But even if it has a structure that the output voltage of the direct-current power supply 15 can be changed to change the voltage, the lamp current can be changed. Even if the reactance is changed by providing a reactance-variable means in the choke coil 21, the lamp current can be changed.

Furthermore, in the third embodiment, if the series inverter circuit 44 has a structure that has a control means to detect the lamp characteristics and match the lighting frequency with the acoustic resonance frequency, particularly the lighting frequency determined by the general formula (Equation 1), it may also have a half bridge circuit, a full bridge circuit, or an one-stone inverter circuit.

Furthermore, in the third embodiment, the control means 49 detects the lamp voltage by utilizing the characteristic that when the shape of the discharge arc becomes straight, the length of discharge becomes shortest and the lamp voltage becomes lowest, to match it with the lighting frequency in which the lamp voltage becomes lowest; but when the fluctuation of the discharge arc due to the acoustic resonance phenomenon is caused, the length of discharge is changed to cause a temporal change in the lamp voltage, it may be matched with the lighting frequency having no temporal change in the lamp voltage (for example, the lighting frequency in which the differential value of the lamp voltage becomes lowest).

Furthermore, from the lamp characteristics other than the lamp voltage, it is possible to match with the acoustic resonance frequency, particularly the lighting frequency determined by the general formula (Equation 1), for example, the frequency can be controlled by detecting the temperature of the tube wall because the sound velocity in the discharge space medium is a function of the temperature, and by detecting the light output by utilizing the characteristics that the light output (luminous flux, spectral distribution, luminous flux density, luminance and the like) changes according to the temperature of the discharge space.

Furthermore, in the first and the second embodiments, the reactor is composed of a choke coil 21, but it may be composed of a condenser or a complex choke coil and condenser circuit so long as it limits the lamp current of the discharge lamp. Other structures may be used so long as the lamp current can be limited.

Furthermore, the starting means 22, 35, 46, 54 and 65 may each have a structure that the high voltage pulse is generated by rising the pressure by a transformer or a structure that a condenser is connected in parallel to the metal halide lamp to generate high voltage at both ends of the condenser by the resonant action with the choke coil. Also, any structure may be used so long as high voltage can be generated so that the metal halide lamp can start the discharge.

Furthermore, in the fourth and the fifth embodiments, the rise of the light output of the metal halide lamps 52 and 61 is quickened and after the light output reaches the rated lighting value, a lamp current 6 to 7 times the rated lighting value is supplied immediately after lighting to control the output to be substantially constant, and it is so controlled that the light output is reduced continuously to the rated lamp impedance according to the rise of the lamp impedance. However, in order to form the straight discharge arc during the whole lighting period, it is enough to supply a current 3 times the rated lighting value immediately after lighting and to reduce it to the rated lamp current; but it is not always necessary to reduce the current continuously, and it may be reduced stepwise. Or it may be such that a lamp current higher than the rated lighting value is supplied for a predetermined period, thereafter the lamp is lighted with the rated lamp current. When the minimum lamp current to be able to form the straight discharge arc during the whole lighting period is supplied, the time required for reaching the rated lighting after lighting will be about 60 seconds.

From the above-mentioned points, it may have a structure that a lamp current about 3 times the rated lighting value is supplied by a means to select the lighting waveform which amplifies the amplitude of the compressional wave emitted from the discharge arc. In addition, a means to supply the lamp current or the lamp power higher than the rated value for a predetermined period at the initial stage of lighting and to reduce it to the rated value is provided to quicken the rise of the light output.

Furthermore, the means to select the lighting waveform which amplifies the amplitude of the compressional wave emitted from the discharge arc has to amplify the amplitude of the compressional wave emitted from the waveform of the frequency component of the acoustic resonance frequency, but the means to supply the lamp current or the lamp power higher than the rated value for a predetermined period at the initial stage of lighting in order to quicken the rise of the light output and to reduce it to the rated value may be controlled by the waveform of the frequency component of the acoustic resonance frequency or by a waveform of other frequency components.

Furthermore, in the fourth and the fifth embodiments, even if the lamp characteristics detecting means 55 and 56 do not detect the lamp impedance, but detect the change of the other lamp characteristics, for example, lamp voltage, light output (luminous flux, spectral distribution, luminous flux density, luminance and the like), temperature of the arc tube, and the lapse of time after lighting, similar effects can be obtained.

Furthermore, in the fourth and the fifth embodiments, the lamp current is controlled in order to amplify the amplitude of the compressional wave from the discharge arc, but the structure may be such that the lamp power which is directly related with the generation of the compressional wave is controlled.

Also, the acoustic resonance frequency of the used metal halide lamp has a characteristic to drop linearly with a predetermined gradient until reaching the rated lighting after lighting with respect to the change of the lamp impedance. Needless to say that since the acoustic resonance frequency is at least a function of the temperature of the discharge space and the atomic weight of the filler, when the supply quantity of the lamp current are changed, and the kinds of fillers and the composition ratio thereof are changed, the change characteristics of the acoustic resonance frequency is changed.

Furthermore, in the structure of the lighting circuit of the fifth embodiment, the direct-current power supply 63 is composed of a step-down chopper circuit 74 which converts the output of the commercial-use alternating-current power supply 67 to the direct current by the rectifying and smoothing circuit 68, and the output of the rectifying and smoothing circuit 68 is converted to a direct current superimposed with a ripple waveform having the frequency component of the acoustic resonance frequency. The section to convert the output of the commercial-use alternating-current power supply 67 to the direct current by the rectifying and smoothing circuit 68 may be a direct-current power supply such as a battery and the like, and the step-down chopper circuit 74 may be a step-up chopper circuit, an inverted chopper circuit, or a forward converter circuit. Any structure may be used so long as it can output the direct-current waveform superimposed with the ripple waveform having the frequency component of the acoustic resonance frequency.

Furthermore, the full bridge inverter circuit 64 may be replaced with a half bridge circuit, or may be other structures so long as it can convert the output of the direct-current power supply to the alternating current. Or, even if the full bridge inverter circuit 64 is not provided, the discharge arc can always be made straight, since the ripple waveform having the frequency component which excites the mode to make the discharge arc straight with the acoustic resonance is supplied to the discharge lamp. Moreover, the conversion frequency of the full bridge inverter circuit 64 is 400 Hz to convert to the alternating current, but it may be other than 400 Hz so long as it is below the frequency of the ripple waveform superimposed thereto.

Furthermore, in the fifth embodiment, a transistor is used as a switching element, but other elements such as FET/IGBT or a thyristor may be used.

As described above, in the present invention, when a waveform in which the instantaneous voltage, or the instantaneous current or the instantaneous power changes temporally with the acoustic resonance frequency which excites the mode to make the discharge arc straight, particularly the frequency f shown by the general formula (Equation 1) is supplied to the discharge lamp, the discharge lamp can be lighted stably with high frequency without causing any fluctuation or discontinuance of the discharge arc, and further the discharge arc of the discharge lamp can be made straight.

Furthermore, by supplying the lighting waveform which has the acoustic resonance frequency component which excites the mode to make the discharge arc straight and amplifies the amplitude of the compressional wave emitted from the discharge arc during the period when the vapor pressure of the filler of the discharge lamp is low to the discharge lamp, the straight discharge arc can be formed and maintained during the whole period of lighting of the discharge lamp (from right after lighting to the rated lighting).

Furthermore, when the discharge lamp is used in combination with the reflector, a plurality of luminous intensity distribution patterns can be realized by one discharge lamp, only by changing the lighting waveform. Particularly, when the discharge lamp is used as a light source for vehicle headlights, the discharge lamp-lighting apparatus which can switch between the passing beam and the travelling beam by one discharge lamp can be realized.

What is claimed is:

1. A discharge lamp-lighting apparatus comprising:

a discharge lamp including a glass envelope defining a discharge space in which at least metal halide or mercury is sealed therein as a filler, and a ballast circuit which supplies a predetermined waveform in operation to said discharge lamp to operate said discharge lamp, and wherein the waveform in operation is selected to be one having a frequency component of the lowest acoustic resonance frequency determined by at least a sound velocity in a discharge space medium of said discharge lamp and a height of a center section orthogonal area to an electrode axis of said discharge lamp, thereby to straighten the discharge arc.

2. A discharge lamp-lighting apparatus according to claim 1, said discharge lamp further includes a pair of electrodes on the electrode axis, wherein the section orthogonal area to the electrode axis of the discharge lamp is located at a center between the electrodes.

3. A discharge lamp-lighting apparatus according to claim 2, wherein the lighting waveform in operation supplied to the discharge lamp having at least two frequency components, where at least one of the frequency components represents an acoustic resonance frequency.

4. A discharge lamp-lighting apparatus according to claim 3, wherein said ballast circuit has a control means for detecting lamp characteristics of said discharge lamp to match an operating frequency of the waveform of operation with the acoustic resonance frequency for straightening arc discharge.

5. A discharge lamp-lighting apparatus according to claim 1, wherein the waveform in operation supplied to the discharge lamp having at least two frequency components, where at least one of the frequency components represents an acoustic resonance frequency.

6. A discharge lamp-lighting apparatus according to claim 5, wherein the lighting circuit includes a direct-current power supply capable of changing an output voltage, said direct-current power supply having an output terminal, an inverter circuit having an output terminal and a control means for detecting a lamp characteristic of the discharge lamp and matching an operating frequency of the waveform of operation with the acoustic resonance frequency, and said inverter circuit connected to the output terminal of said direct-current power supply for converting the direct-current output of said direct-current power supply to the alternating current of said acoustic resonance frequency, a reactor for controlling a lamp current of the discharge lamp connected to said output terminal of said inverter circuit, a starting means for starting said discharge lamp, said starting means connected between said reactor and said discharge lamp, and a lamp power-detecting circuit for detecting a lamp power of said discharge lamp; and whereby the output voltage of said direct-current power supply is changed according to an output signal of said lamp power-detecting circuit and the lamp power is supplied to the discharge lamp at a predetermined value.

7. A discharge lamp-lighting apparatus according to claim 1, wherein said ballast circuit has a control means for detecting lamp characteristics of said discharge lamp to match an operating frequency of the waveform of operation with the acoustic resonance frequency for straightening arc discharge.

8. A discharge lamp-lighting apparatus according to claim 7, wherein said control means has a means for detecting the lamp voltage as the lamp characteristic of the discharge lamp and the operating frequency in which the lamp voltage becomes lowest as the acoustic resonance frequency.

9. A discharge lamp-lighting apparatus according to claim 1, wherein said ballast circuit includes a direct-current power supply capable of changing an output voltage, said direct-current power supply having an output terminal, an inverter circuit having an output terminal and a control means for detecting a lamp characteristic of the discharge lamp and matching an operating frequency of the waveform of operation with the acoustic resonance frequency, and said inverter circuit connected to the output terminal of said direct-current power supply for converting the direct-current output of said direct-current power supply to the alternating current of said acoustic resonance frequency, a reactor for controlling a lamp current of the discharge lamp connected to said output terminal of said inverter circuit, a starting means for starting said discharge lamp, said starting means connected between said reactor and said discharge lamp, and a lamp power-detecting circuit for detecting a lamp power of said discharge lamp; and whereby the output voltage of said direct-current power supply is changed according to an output signal of said lamp power-detecting circuit and the lamp power is supplied to the discharge lamp at a predetermined value.

10. A discharge lamp-lighting apparatus comprising:

a discharge lamp including a glass envelope defining a discharge space in which at least metal halide or mercury is sealed therein as a filler, and a ballast circuit which supplies a predetermined waveform in operation to said discharge lamp to operate said discharge lamp, and wherein the predetermined waveform in operation is supplied from said ballast circuit to said discharge lamp, in which said waveform in operation has an instantaneous value that temporally changes with a frequency f, wherein $f=V/(2L)$, and where V represents a sound velocity in a discharge space medium of said discharge lamp and L represents a height of a section orthogonal area to an electrode axis of said discharge lamp.

11. A discharge lamp-lighting apparatus according to claim 10, wherein said discharge lamp further includes a pair of electrodes on the electrode axis, and wherein the section orthogonal area to the electrode axis of said discharge lamp is located at a center between said electrodes.

12. A discharge lamp-lighting apparatus according to claim 10, wherein the waveform in operation supplied to the discharge lamp having at least two frequency components, where at least one of the frequency components represents an acoustic resonance frequency.

13. A discharge lamp-lighting apparatus according to claim 12, wherein said ballast circuit includes a direct-current power supply capable of changing an output voltage, said direct-current power supply having an output terminal, an inverter circuit having an output terminal and a control means for detecting a lamp characteristic of the discharge lamp and matching an operating frequency of the waveform of operation with the acoustic resonance frequency, and said inverter circuit connected to the output terminal of said direct-current power supply for converting the direct-current output of said direct-current power supply to the alternating current of said acoustic resonance frequency, a reactor for controlling a lamp current of the discharge lamp connected to said output terminal of said inverter circuit, a starting means for starting said discharge lamp, said starting means connected between said reactor and said discharge lamp, and a lamp power-detecting circuit for detecting a lamp power of said discharge lamp; and whereby the output voltage of said direct-current power supply is changed according to an output signal of said lamp power-detecting circuit and the lamp power is supplied to the discharge lamp at a predetermined value.

14. A discharge lamp-lighting apparatus according to claim 10, wherein said ballast circuit has a control means for detecting lamp characteristics of said discharge lamp to match an operating frequency of the waveform of operation with the acoustic resonance frequency for straightening arc discharge.

15. A discharge lamp-lighting apparatus according to claim 10, wherein said ballast circuit includes a direct-current power supply capable of changing an output voltage, said direct-current power supply having an output terminal, an inverter circuit having an output terminal and a control means for detecting a lamp characteristic of the discharge lamp and matching an operating frequency of the waveform of operation with the acoustic resonance frequency, and said inverter circuit connected to the output terminal of said direct-current power supply for converting the direct-current output of said direct-current power supply to the alternating current of said acoustic resonance frequency, a reactor for controlling a lamp current of the discharge lamp connected to said output terminal of said inverter circuit, a starting means for starting said discharge lamp, said starting means connected between said reactor and said discharge lamp, and a lamp power-detecting circuit for detecting a lamp power of said discharge lamp; and whereby the output voltage of said direct-current power supply is changed according to an output signal of said lamp power-detecting circuit and the lamp power is supplied to the discharge lamp at a predetermined value.

16. A discharge lamp-lighting apparatus comprising:

a discharge lamp including a glass envelope defining a discharge space in which at least metal halide or mercury is sealed therein as a filler, and a ballast circuit having a means for selecting a waveform for operation supplied to said discharge lamp to be the one which has a frequency component of an acoustic resonance frequency which is based on a sound velocity in a discharge space medium of said discharge lamp and a height of a section orthogonal area to an electrode axis of said discharge lamp to excite a mode to straighten the discharge arc, and there is a period of time in which the acoustic resonance frequency decreases before operation under a rated power condition is reached after starting said discharge lamp.

17. A discharge lamp-lighting apparatus according to claim 11, wherein the time to reach operation under the rated power condition after starting of the discharge lamp is 60 seconds or less.

18. A discharge lamp-lighting apparatus according to claim 16, wherein said ballast circuit includes a means for supplying the lamp current or the lamp power higher than the rated value during a predetermined period to reach operation under the rated power condition after starting the discharge lamp and reducing the lamp current or the lamp power to the rated value to decrease the time to reach operation under the rated power condition after starting of said discharge lamp.

19. A discharge lamp-lighting apparatus according to claim 16, wherein said ballast circuit further includes a direct-current power supply which outputs a direct current superimposed with a ripple waveform having a frequency component equal to the acoustic resonance frequency to excite at least a mode to straighten the discharge arc, and whereby the waveform in operation is supplied to the discharge lamp.

20. A discharge lamp-lighting apparatus according to claim 19, further comprising an inverter circuit which converts an output of said direct-current power supply to an alternating current.

21. A discharge lamp-lighting apparatus according to claim 19, wherein said direct-current power supply has at least one switching element which operates on an ON/OFF cycle, the ON/OFF cycle of said at least one switching element being changed to change the frequency of the ripple waveform to be supplied to said discharge lamp, and the ratio of the ON period of said at least one switching element being changed to change the lamp current or the lamp power supplied to said discharge lamp.

22. A discharge lamp-lighting apparatus comprising:

a discharge lamp including a glass envelope defining a discharge space in which at least metal halide or mercury is sealed therein as a filler, and a ballast circuit having a first means for selecting a waveform in operation supplied to the discharge lamp which has a frequency component of an acoustic resonance frequency which is based on a sound velocity in a discharge space medium and a height of a section orthogonal area to an electrode axis of said discharge lamp to excite a mode to straighten the discharge arc, and a second means for selecting said waveform in operation which amplifies the amplitude of a compressional wave emitted from the discharge arc during a period of low vapor pressure of the filler of the discharge lamp.

23. A discharge lamp-lighting apparatus according to claim 22, wherein
said second means amplifies the amplitude of the lamp current or the lamp power of the frequency component of the acoustic resonance frequency supplied to the discharge lamp.

24. A discharge lamp-lighting apparatus according to claim 23, wherein said ballast circuit includes a means for supplying the lamp current or the lamp power higher than the rated value during a predetermined period to reach operation under the rated power condition after starting the discharge lamp and reducing the lamp current or the lamp power to the rated value to decrease the time to reach operation under the rated power condition after starting of said discharge lamp.

25. A discharge lamp-lighting apparatus according to claim 23, wherein
said ballast circuit further includes a direct-current power supply which outputs a direct current superimposed with a ripple waveform having a frequency component equal to the acoustic resonance frequency to excite at least a mode to straighten the discharge arc, and
whereby the waveform in operation is supplied to the discharge lamp.

26. A discharge lamp-lighting apparatus according to claim 22, wherein there is a period of time in which the acoustic resonance frequency decreases before operation under a rated power condition is reached after starting said discharge lamp.

27. A discharge lamp-lighting apparatus according to claim 26, wherein the time to reach operation under the rated power condition after starting of the discharge lamp is 60 seconds or less.

28. A discharge lamp-lighting apparatus according to claim 22, wherein said ballast circuit includes a means for supplying the lamp current or the lamp power higher than the rated value during a predetermined period to reach operation under the rated power condition after starting the discharge lamp and reducing the lamp current or the lamp power to the rated value to decrease the time to reach operation under the rated power condition after starting of said discharge lamp.

29. A discharge lamp-lighting apparatus according to claim 28, wherein
the ballast circuit includes a characteristic detecting means which detects the lamp characteristic in order to change the waveform in operation, the lamp current or the lamp power of at least one means from a group comprising:
said first means,
said second means, and
said supplying means.

30. A discharge lamp-lighting apparatus according to claim 29, wherein
the lamp characteristics detecting means detects a lamp voltage, a lamp impedance, a light output, a temperature of the arc tube, or an elapsed time after starting.

31. A discharge lamp-lighting apparatus according to claim 22, wherein
said ballast circuit further includes a direct-current power supply which outputs a direct current superimposed with a ripple waveform having a frequency component equal to the acoustic resonance frequency to excite at least a mode to straighten the discharge arc, and
whereby the waveform in operation is supplied to the discharge lamp.

32. A discharge lamp-lighting apparatus comprising:
a discharge lamp including a glass envelope defining a discharge space of not more than 0.2 $cm^3$ in which at least Xenon gas having a cold pressure of 3 atm or higher, mercury and metal halide in the volume of from 0.02 mg to 0.5 mg are sealed therein as a filler, and said metal including at least sodium and scandium, and
a ballast circuit to supply a waveform in operation having a frequency component equal to an acoustic resonance frequency which straightens the discharge arc in said discharge lamp to operate said discharge lamp,
wherein the acoustic resonance frequency decreases 5%–15% during a period before operation under a rated power condition is reached after starting, and an amplitude of the waveform in operation having the frequency component of the acoustic resonance frequency becomes three times or higher during the time of operation under the rated power conditions during a period in which the vapor pressure of said filler is low.

33. A discharge lamp-lighting apparatus comprising:
a discharge lamp including a glass envelope defining a discharge space in which at least metal halide or mercury is sealed therein as a filler, and
a ballast circuit which supplies a predetermined waveform in operation to said discharge lamp to operate said discharge lamp, and
a light control means which irradiates a light emitted from said discharge lamp in a predetermined direction,
wherein the waveform in operation has a frequency component equal to an acoustic resonance frequency to excite a mode to straighten the discharge arc, and the waveform in operation is able to form at least two luminous intensity distribution patterns by changing the rate of the frequency component of the acoustic resonance frequency to change the shape of the discharge arc.

34. A discharge lamp-lighting apparatus according to claim 33, wherein
the at least two luminous intensity distribution patterns are formed in vehicle headlights, a first luminous intensity distribution pattern being used for a lower beam and a second luminous intensity distribution pattern being used for an upper beam,
wherein a shape of a discharge arc of the discharge lamp is straight for a most frequently used luminous intensity distribution pattern.

* * * * *